United States Patent
Fushiki et al.

(10) Patent No.: US 9,616,824 B2
(45) Date of Patent: Apr. 11, 2017

(54) SOUNDPROOF BODY FOR MOTOR VEHICLES AND SILENCER FOR MOTOR VEHICLES

(71) Applicant: HOWA TEXTILE INDUSTRY CO., LTD., Kasugai-shi, Aichi (JP)

(72) Inventors: Shinobu Fushiki, Kasugai (JP); Takahiro Asai, Kasugai (JP); Junichi Sato, Kasugai (JP)

(73) Assignee: HOWA TEXTILE INDUSTRY CO., LTD., Kasugai (JP)

( * ) Notice: Subject to any disclaimer, the term of this patent is extended or adjusted under 35 U.S.C. 154(b) by 0 days.

(21) Appl. No.: 14/821,470

(22) Filed: Aug. 7, 2015

(65) Prior Publication Data

US 2016/0059797 A1    Mar. 3, 2016

(30) Foreign Application Priority Data

Sep. 3, 2014 (JP) ................................. 2014-178966

(51) Int. Cl.
*B60R 13/08* (2006.01)

(52) U.S. Cl.
CPC ........ *B60R 13/0815* (2013.01); *B60R 13/083* (2013.01)

(58) Field of Classification Search
CPC . B60R 13/0256; B60R 13/08; B60R 13/0815; B60R 13/083; F02B 77/11
USPC ....................................................... 296/39.3
See application file for complete search history.

(56) References Cited

U.S. PATENT DOCUMENTS

| | | |
|---|---|---|
| 5,554,831 A | 9/1996 | Matsukawa et al. |
| 5,817,408 A | 10/1998 | Orimo et al. |
| 6,102,465 A | 8/2000 | Nemoto et al. |
| 6,673,412 B2 | 1/2004 | Ramesh et al. |
| 6,685,250 B2 | 2/2004 | Misaji et al. |
| 7,017,250 B2 | 3/2006 | Gebreselassie et al. |
| 7,201,253 B2 | 4/2007 | Duval et al. |
| 7,238,407 B2 | 7/2007 | Wesch et al. |
| 7,332,440 B2 * | 2/2008 | Choi .................... C23F 1/02 134/1 |
| 8,371,635 B2 | 2/2013 | Mizata |
| 8,695,758 B2 * | 4/2014 | Fushiki ................. B32B 5/22 181/284 |
| 2005/0126848 A1 | 6/2005 | Siavoshai et al. |
| 2009/0250292 A1 * | 10/2009 | Hayasaka ............ B60R 13/083 181/290 |
| 2010/0196686 A1 * | 8/2010 | Van Dam ............... B32B 5/14 428/219 |
| 2011/0254307 A1 * | 10/2011 | Castagnetti ........ B60R 13/0815 296/39.3 |

FOREIGN PATENT DOCUMENTS

JP       3930506 B2      6/2007

* cited by examiner

Primary Examiner — Jason S Daniels
(74) Attorney, Agent, or Firm — Oliff PLC

(57) ABSTRACT

A dash silencer has a lamination structure of a first layer, an intermediate layer, and a second layer. The intermediate layer is formed as a non-air permeable thin-membrane layer. The second layer is formed as a perforated layer having a plurality of opening portions.

16 Claims, 17 Drawing Sheets

SOUNDPROOF BODY FOR MOTOR VEHICLES AND SILENCER FOR MOTOR VEHICLES

BACKGROUND OF THE INVENTION

Field of the Invention

The present invention relates to a soundproof body for motor vehicles suitable for insulating noises and a silencer for motor vehicles suitable for performing soundproofing of, for example, noises propagating into motor vehicles and noises within the motor vehicles.

Description of the Related Art

Conventionally as a soundproof body of this type, an ultralight soundproof body described in Japanese Patent No. 3,930,506 has been proposed. The ultralight soundproof body includes a sound absorption layer and a non-air permeable resonant layer. The non-air permeable resonant layer is adhered to the sound absorption layer through an adhesive layer. Thus, the soundproof body absorbs sounds by producing resonance at an interface between the sound absorption layer and the non-air permeable resonant layer.

By the way, in the soundproof body constructed as described above, the sound absorption layer is an air permeable layer made of felt or the like. On the other hand, there are no changes in the case that the non-air permeable resonant layer is a non-air permeable layer.

Accordingly, when the soundproof body is disposed at the sound absorption layer along a dash panel which is a component to be disposed on a boundary between an engine room and a vehicle compartment of a motor vehicle, engine sounds generated in the engine room propagates as noises, through the dash panel and the soundproof body in this order, and then reaches the interior of the motor vehicle compartment.

Herein, the noises are incident on the dash panel, the sound absorption layer, the adhesive layer, and the non-air permeable resonant layer in this order. Since the sound absorption layer is made of an air permeable material such as felt or the like, the sound absorption layer functions as an air layer.

Thus, in a process in which the noises are incident on the dash panel, the air layer equivalent to the sound absorption layer, the adhesive layer, and the non-air permeable resonant layer in this order, the air layer equivalent to the sound absorption layer functions as a spring layer in between the non-air permeable resonant layer in accordance with the sound pressure of the noises propagating through the dash panel.

As a result, the dash panel and the non-air permeable resonant layer cause a transmission resonance phenomenon under the spring action of the air layer equivalent to the sound absorption layer, thereby to degrade the transmission resonance phenomenon as the sound absorption performance of the soundproof body in a low-frequency range of noises.

SUMMARY OF THE INVENTION

It is therefore an object of the present invention to provide a soundproof body for motor vehicles capable of achieving further reduction in weight and performing soundproofing of noises enough over a wide frequency range without a transmission resonance phenomenon which tends to occur in relation to a low-frequency range of noises by utilizing a multilayer structure of a thin-membrane layer and a perforated layer.

It is another object of the present invention to provide a silencer for motor vehicles utilizing the soundproof body as described above.

In order to solve the object according to the present invention, there is provided a soundproof body for a motor vehicle comprising a first layer made of a porous material, an intermediate layer stacked on the first layer, and a second layer stacked on the intermediate layer so as to face the first layer through the intermediate layer. In the soundproof body, the intermediate layer is formed as a non-air permeable thin-membrane layer, and the second layer is formed as a perforated layer.

According to such a construction, in a case where the soundproof body is disposed along a plate-shaped member in a vehicle body of a motor vehicle such that noises are incident on the first layer of the soundproof body through the plate-shaped member in the vehicle body of the motor vehicle, the noises are incident on the first layer of the soundproof body through the plate-shaped member in the vehicle body when the noises are incident on the plate-shaped member in the vehicle body.

Then, the noises are absorbed by the first layer of the soundproof body based on the porous material which is the material of the first layer, and are incident on the intermediate layer equivalent to the non-air permeable thin-membrane layer.

Subsequently, the noises incident on the intermediate layer are insulated by the intermediate layer under vibrations of the intermediate layer, and are incident on the perforated layer equivalent to the second layer and thereafter absorbed by the perforated layer.

Herein, the second layer is the perforated layer. Thus, the second layer is lighter in weight than a second layer having no opening portions. Hence, the soundproof body itself is reduced in weight.

Furthermore, the soundproof body constructs a three-layer structure by the first layer and the intermediate layer together with the plate-shaped member of the vehicle body. Herein, the three-layer structure is constructed by sandwiching the first layer between the intermediate layer and the plate-shaped member of the vehicle body.

The first layer is made of the porous material, and therefore is equivalent to an air layer. On the other hand, the intermediate layer is the non-air permeable thin-membrane layer, as described above.

Accordingly, the three-layer structure is constructed by sandwiching the air layer between the non-air permeable thin-membrane layer and the plate-shaped member of the vehicle body.

From this reason, in the process in which noises are incident on the first layer and the intermediate layer of the soundproof body through the plate-shaped member of the vehicle body as described above, the first layer exerts spring action like the air layer against the vibrations when the plate-shaped member vibrates under variations in sound pressure of the noises.

Accordingly, the intermediate layer receives the spring action of the first layer and then vibrates together with the plate-shaped member of the vehicle body. At this time, the intermediate layer equivalent to the non-air permeable thin-membrane layer and the first layer made of the porous material entirely vibrate together with the plate-shaped member, based on the variations in sound pressure of the noises.

As a result, the intermediate layer and the first layer tend to cause a transmission resonance phenomenon together with the plate-shaped member in the low-frequency range of noises.

However, the second layer equivalent to the perforated layer is stacked on the intermediate layer so as to face the first layer through the intermediate layer, as described above. Therefore, when the intermediate layer entirely vibrates together with the first layer and the plate-shaped member as described above, the second layer receives the vibrations of the intermediate layer.

Herein, the second layer is the perforated layer, and is thus constructed by a layer portion and a perforated portion. Accordingly, the intermediate layer constructs a two-layer structure at its corresponding portion to the layer portion of the perforated layer together with the layer portion of the perforated layer. On the other hand, the intermediate layer constructs a single-layer structure at its corresponding portion to the perforated portion of the perforated layer.

Therefore, when the second layer receives the vibrations from the intermediate layer as described above, the perforated portion of the perforated layer and the corresponding portion of the intermediate layer to the perforated portion construct the single-layer structure of only the corresponding portion of the intermediate layer and thus vibrate in accordance with the vibrations of the intermediate layer. On the other hand, the layer portion of the perforated layer and the corresponding portion of the intermediate layer to the layer portion form the two-layer structure, and thus perform vibrations with deviation or difference in phase from the vibrations at the single-layer structure.

In other words, in the two-layer structure of the intermediate layer and the second layer, vibrations with deviation in phase are produced between the corresponding portion of the intermediate layer to the layer portion of the perforated layer and the corresponding portion of the intermediate layer to the perforated portion of the perforated layer.

Accordingly, even if the intermediate layer and the first layer of the soundproof body tend to cause the transmission resonance phenomenon in conjunction with the plate-shaped member in the low-frequency range of the noise as described above, the transmission resonance phenomenon can be favorably suppressed based on the deviation in phase of vibrations between the intermediate layer and the perforated layer.

This means that degradation in sound absorption performance of the soundproof body owing to the transmission resonance phenomenon which tends to occur in the low-frequency range of the noises can be favorably suppressed based on the deviation in phase of vibrations between the intermediate layer and the perforated layer.

As a result, the soundproof body suppresses the transmission resonance phenomenon tending to occur in the low-frequency range of the noises in relation to the plate-shaped member, thereby to be able to be provided as a soundproof body for a motor vehicle capable of favorably performing soundproofing of noises over a wide frequency range from a low-frequency range to a high-frequency range of the noises. In addition, the intermediate layer is the non-air permeable thin-membrane layer, and is therefore lighter in weight than the second layer. Accordingly, the soundproof body can be provided as a soundproof body which is much lighter in weight than a conventional soundproof body.

In the soundproof body for a motor vehicle according to the present invention, the intermediate layer is formed from at least one film, as the non-air permeable thin-membrane layer, and the second layer is formed as a perforated porous layer made of a porous material so as to have a plurality of opening portions in a dispersed state.

As described above, the intermediate layer is formed from at least one film, as the non-air permeable thin-membrane layer, and the second layer is formed as the perforated porous layer made of the porous material so as to have the plurality of opening portions in the dispersed state. Thus, the operations and effects of the present invention can be achieved more favorably.

In the soundproof body for a motor vehicle according to the present invention, the intermediate layer is constructed as a three-layer film structure of a one-side fusion film made of a thermoplastic material and fused to the first layer, a barrier film made of a thermoplastic material which is higher in melting point than the thermoplastic material of the one-side fusion film, and fused to the one-side fusion film so as to face the first layer through the one-side fusion film, and an other-side fusion film made of a thermoplastic material which is lower in melting point than the thermoplastic material of the barrier film, and fused to the barrier film so as to face the one-side fusion film through the barrier film, and the second layer is formed as a perforated porous layer made of a porous material so as to have a plurality of opening portions in a dispersed state, and is fused to the other-side fusion film of the intermediate layer.

As described above, the intermediate layer is constructed as the three-layer film structure, and the second layer is constructed as the perforated porous layer which is formed so as to have the plurality of opening portions in the dispersed manner. Thus, the operations and effects of the present invention can be further improved.

According to still another aspect of the present invention, in the soundproof body for a motor vehicle, the second layer has the plurality of opening portions formed at an opening ratio suitable for reducing noises over a wide frequency range from a low-frequency range to a high frequency of the noises.

With such a construction, the operations and effects of the present invention can be further improved.

A soundproof body for a motor vehicle according to the present invention includes a first layer made of a porous material, an intermediate layer stacked on the first layer, and a second layer stacked on the intermediate layer so as to face the first layer through the intermediate layer, wherein the intermediate layer is formed as an air permeable thin-membrane layer having a plurality of opening portions formed in a dispersed state at an opening ratio and an opening diameter which tend to cause a transmission resonance phenomenon in relation to a low-frequency range of noises, and the second layer is formed as a perforated layer.

According to such a construction, in a case where the soundproof body is disposed along a plate-shaped member in a vehicle body of a motor vehicle such that noises are incident on the first layer of the soundproof body through the plate-shaped member in the vehicle body of the motor vehicle, the noises are incident on the first layer of the soundproof body through the plate-shaped member in the vehicle body, when the noises are incident on the plate-shaped member in the vehicle body.

Then, the noises are absorbed by the first layer of the soundproof body under the porous material which is the material of the first layer, and are thereafter incident on the intermediate layer.

Herein, the intermediate layer sandwiches the first layer in between the plate-shaped member in the vehicle body, thereby to construct a three-layer structure in conjunction with the first layer and the plate-shaped member in the vehicle body. Besides, the intermediate layer is formed as the air permeable thin-membrane layer having the plurality of opening portions formed in the dispersed state at the opening ratio and diameter which tend to cause the transmission resonance phenomenon in relation to the low-frequency range of the noises, as described above.

And also, the first layer is made of the porous material, and thus is equivalent to an air layer. Accordingly, the three-layer structure is constructed by sandwiching the air layer between the plate-shaped member in the vehicle body and the air permeable thin-membrane layer having the plurality of opening portions formed in the dispersed state at the opening ratio and opening diameter which tend to cause the transmission resonance phenomenon in relation to the low-frequency range of the noises.

From this reason, when the plate-shaped member in the vehicle body vibrates under variations in sound pressure of the noises in the process in which noises are incident on the first layer and the intermediate layer of the soundproof body through the plate-shaped member, as described above, the first layer exerts spring action like the air layer based on the vibrations.

Accordingly, the intermediate layer receives the spring action of the first layer to vibrate in conjunction with the plate-shaped member in the vehicle body. At this time, the first layer and the intermediate layer entirely vibrate in conjunction with the plate-shaped member, based on the variations or fluctuations in sound pressure of the noises. Herein, the first layer is formed from the porous material, and thus functions as the air layer. And, the intermediate layer functions as the air permeable thin-membrane layer having the plurality of opening portions formed in the dispersed state at the opening ratio and opening diameter which tend to cause the transmission resonance phenomenon in relation to the low-frequency range of the noises, as previously described.

Consequently, the intermediate layer and the first layer is susceptible to cause the transmission resonance phenomenon together with the plate-shaped member in the low-frequency range of the noises.

However, the second layer is stacked on the intermediate layer so as to face or oppose to the first layer through the intermediate layer. Therefore, when the intermediate layer entirely vibrates together with the first layer and the plate-shaped member as described above, the second layer receives the vibrations of the intermediate layer.

Herein, the second layer is the perforated layer, as described above. Thus, the second layer is constructed by a layer portion and a perforated portion. Accordingly, the intermediate layer constructs a two-layer structure at its corresponding portion thereof to the layer portion of the perforated layer with the layer portion of the perforated layer. On the other hand, the intermediate layer constructs a single-layer structure at its corresponding portion thereof to the perforated portion of the perforated layer.

Accordingly, when the second layer receives the vibrations from the intermediate layer as described above, the perforated portion of the perforated layer and the corresponding portion of the intermediate layer to the perforated portion construct the single-layer structure of only the corresponding portion of the intermediate layer, thereby to vibrate in accordance with the vibrations of the intermediate layer. On the other hand, the layer portion of the perforated layer and the corresponding portion of the intermediate layer to the layer portion construct the two-layer structure, thereby to perform vibrations with deviation in phase from the vibrations of the single-layer structure.

In other words, in the two-layer structure of the intermediate layer and the second layer, the corresponding portion of the intermediate layer to the layer portion of the perforated layer and the corresponding portion of the intermediate layer to the perforated portion of the perforated layer perform vibrations with deviation in phase from each other.

Accordingly, even when the intermediate layer and the first layer of the soundproof body tend to cause the transmission resonance phenomenon together with the plate-shaped member in the low-frequency range of the noises since the intermediate layer is formed as the air permeable thin-membrane layer having the plurality of opening portions formed in the dispersed state at the opening ratio and opening diameter which tend to cause the transmission resonance phenomenon in relation to the low-frequency range of the noises, the transmission resonance phenomenon can be favorably suppressed based on the deviation in phase of vibrations between the intermediate layer and the perforated layer as described above.

This means that from the fact that the intermediate layer is formed as the air permeable thin-membrane layer having the plurality of opening portions formed in the dispersed state at the opening ratio and opening diameter which tend to cause the transmission resonance phenomenon in relation to the low-frequency range of the noises, degradation in sound absorption performance of the soundproof body owing to the transmission resonance phenomenon which tends to occur in the low-frequency range of the noises can be favorably suppressed based on the deviation in phase of vibrations between the intermediate layer and the perforated layer.

As a result, on the assumption that the intermediate layer is formed as the air permeable thin-membrane layer having the plurality of opening portions formed in the dispersed state at the opening ratio and opening diameter which are capable of causing the transmission resonance phenomenon in relation to the low-frequency range of the noises, the soundproof body suppresses a transmission resonance phenomenon which tends to occur in the low-frequency range of the noises under a three-layer structure of an intermediate layer, a first layer and a plate-shaped member of a vehicle body, thereby to be provided as a soundproof body for a motor vehicle capable of favorably performing soundproofing of the noises over a wide frequency range from a low-frequency range to a high frequency range of the noises.

Moreover, because the second layer is the perforated layer, it is lighter in weight than a second layer having no opening portions. Therefore, the soundproof body itself can be reduced in weight. Furthermore, the intermediate layer is the air permeable thin-membrane layer. Thus, the intermediate layer is lighter in weight than the second layer. The soundproof body can be, therefore, provided as a soundproof body which is much lighter in weight than a conventional soundproof body.

According to an aspect of the present invention, in the soundproof body for a motor vehicle, the intermediate layer is formed from at least one film as the air permeable thin-membrane layer having the plurality of opening portions formed at the opening ratio and opening diameter, and the second layer is formed as a perforated porous layer made of a porous material so as to have a plurality of opening portions in a dispersed state.

In such a manner, the intermediate layer is formed from at least one film as the air permeable thin-membrane layer having the above-mentioned construction, and the second layer is formed as the perforated porous layer made of the porous material so as to have the plurality of opening portions in the dispersed state. Accordingly, the operations and effects of the present invention can be achieved more favorably.

According to another aspect of the present invention, in soundproof body for a motor vehicle, the intermediate layer is constructed as a three-layer film structure by a one-side fusion film made of a thermoplastic material and fused to the first layer, a barrier film made of a thermoplastic material which is higher in melting point than the thermoplastic material of the one-side fusion film and fused to the first fusion film so as to face the first layer through the one-side fusion film, and an other-side fusion film made of a thermoplastic material which is lower in melting point than the thermoplastic material of the barrier film and fused to the barrier film so as to face the one-side fusion film through the barrier film, the three-layer film structure having a plurality of opening portions formed at the opening ratio and the opening diameter, and the second layer is formed as the perforated porous layer made of the porous material so as to have the plurality of opening portions formed in the dispersed state, and is fused to the other-side fusion film of the intermediate layer.

As described above, the intermediate layer is constructed as the three-layer film structure which is the air permeable thin-membrane layer having the plurality of opening portions formed in the dispersed state at the opening ratio and opening diameter which are capable of causing the transmission resonance phenomenon in relation to the low-frequency range of the noises, and the second layer is constructed as the perforated porous layer having the plurality of opening portions formed in the dispersed state. Thus, the operations and effects of the present invention can be further improved.

According to still another aspect of the present invention, in the soundproof body for a motor vehicle, the second layer has the plurality of opening portions formed at an opening ratio suitable for reducing noises over a wide frequency range from a low-frequency range to a high frequency of the noises.

With such a construction, the operations and effects of the present invention can be further improved.

In order to solve the object according to the present invention, there is provided a silencer for a motor vehicle with a vehicle body being mounted on a plate-shaped member in the vehicle body which comprises, a soundproof body including, a first layer made of a porous material, an intermediate layer stacked on the first layer and formed from a non-air permeable thin-membrane layer, and a second layer stacked on the intermediate layer so as to face the first layer through said intermediate layer and formed from a perforated layer, wherein in the soundproof body, the first layer is mounted on the plate-shaped member of the vehicle body.

In such a manner, the soundproof body has the first layer, the intermediate layer and the second layer respectively as described above, and is mounted at the first layer on the plate-shaped member of the vehicle body.

Accordingly, even if the intermediate layer and the first layer of the soundproof body tend to cause the transmission resonance phenomenon in conjunction with the plate-shaped member in the low-frequency range of the noise as described above, degradation in sound absorption performance of the soundproof body owing to the transmission resonance phenomenon which tends to occur in the low-frequency range of the noises can be favorably suppressed based on the deviation in phase of vibrations between the intermediate layer and the perforated layer.

As a result, the silencer for the motor vehicle can preferably perform soundproofing of noises propagating thereto with the soundproof body capable of preferably performing soundproofing of the noises over a wide frequency range from a low-frequency range to a high-frequency range of the noises.

Herein, the silencer for the motor vehicle according to the present invention forms the intermediate layer as the non-air permeable thin-membrane layer with at least one film, and also forms the second layer as a perforated porous layer made of a porous material so as to have a plurality of opening portions in a dispersed state. Thus, it is possible to provide the silencer for the motor vehicle capable of preferably attaining the above mentioned operations and effects.

According to still another aspect of the present invention, in the silencer for the motor vehicle, the intermediate layer is constructed as a three-layer film structure of a one-side fusion film made of a thermoplastic material and fused to the first layer, a barrier film made of a thermoplastic material which is higher in melting point than the thermoplastic material of the one-side fusion film, and fused to the one-side fusion film so as to face the first layer through the one-side fusion film, and an other-side fusion film made of a thermoplastic material which is lower in melting point than the thermoplastic material of the barrier film, and fused to the barrier film so as to face the one-side fusion film through the barrier film, and the second layer is formed as a perforated porous layer made of a porous material so as to have a plurality of opening portions in a dispersed state, and is fused to the other-side fusion film of the intermediate layer.

As described above, the intermediate layer is constructed as the three-layer film structure, and the second layer is constructed as the perforated porous layer which is formed so as to have the plurality of opening portions in the dispersed manner.

Thus, the operations and effects of the present invention can be further improved.

In order to solve the object according to the present invention, there is provided a silencer for a motor vehicle with a vehicle body being mounted on a plate-shaped member in the vehicle body which comprises a soundproof body including, a first layer made of a porous material, an intermediate layer stacked on the first layer, and a second layer stacked on the intermediate layer so as to face the first layer through said intermediate layer.

In the soundproof body, the intermediate layer is formed as an air permeable thin-membrane layer having a plurality of opening portions formed in a dispersed state at an opening ratio and an opening diameter which tend to cause a transmission resonance phenomenon in relation to a low-frequency range of noises, the second layer is formed as a perforated layer, and is mounted at the first layer on the plate-shaped member of the vehicle body.

Thus, the operations and effects according to the present invention as the silencer for the motor vehicle are preferably attained.

Herein, in the silencer for the motor vehicle in accordance with the present invention, the intermediate layer is formed as the air permeable thin-membrane layer formed so as to form a plurality of opening portions at the opening ratio and diameter, as described above, with at least one film, and the second layer is formed as the perforated porous layer formed from the porous material so as to have a plurality of opening portions in the dispersed state.

Accordingly, operations and effects as the silencer for the motor vehicle in accordance with the present invention can be preferably improved.

In order to solve the object according to the present invention, there is provided a silencer for a motor vehicle with a vehicle body being mounted on a plate-shaped member in the vehicle body which comprises a soundproof body including, a first layer made of a porous material, an intermediate layer stacked on the first layer, and a second layer stacked on the intermediate layer so as to face the first layer through said intermediate layer, In the soundproof body, the intermediate layer is formed as an air permeable thin-membrane layer having a plurality of opening portions formed in a dispersed state at an opening ratio and an opening diameter which tend to cause a transmission resonance phenomenon in relation to a low-frequency range of noises, and the second layer is formed as a perforated layer. Furthermore, the second layer is formed as the perforated layer, and the first layer is mounted on the plate-shaped member of the vehicle body.

Consequently, operations and effects as the silencer according to the present invention can be more improved.

Herein, in the silencer for the motor vehicle, the intermediate layer is formed from at least one film as the air permeable thin-membrane layer having the plurality of opening portions formed at the opening ratio and diameter, and the second layer is formed as a perforated porous layer made of a porous material so as to have a plurality of opening portions in a dispersed state.

Thus, operations and effects as the silencer for the motor vehicle according to the present invention can be attained preferably.

According to an aspect of the present invention, the intermediate layer is constructed as a three-layer film structure of a one-side fusion film made of a thermoplastic material and fused to the first layer, a barrier film made of a thermoplastic material which is higher in melting point than the thermoplastic material of the one-side fusion film, and fused to the one-side fusion film so as to face the first layer through the one-side fusion film, and an other-side fusion film made of a thermoplastic material which is lower in melting point than the thermoplastic material of the barrier film, and fused to the barrier film so as to face the one-side fusion film through the barrier film, and the second layer is formed as a perforated porous layer made of a porous material so as to have a plurality of opening portions in a dispersed state, and is fused to the other-side fusion film of the intermediate layer.

Thus, operations and effects as the silencer for the motor vehicle according to the present invention can be more improved.

According to another aspect of the present invention, in the silencer for the motor vehicle, the plate-shaped member in the vehicle body of the motor vehicle is a dash panel configured to separate an engine room and a vehicle compartment from each other in a vehicle body of a motor vehicle, and the soundproof body is mounted, as a dash silencer, at the first layer on the dash panel from the inside of the vehicle compartment.

According to this construction, the silencer can favorably perform soundproofing of noises propagating from the engine room through the dash panel owing to the sound soundproofing function as the dash silencer.

Herein, the soundproof body is mounted at the first layer on the dash panel. Therefore, the intermediate layer and the first layer form the three-layer structure in between the dash panel, the three-layer structure being susceptible to cause the above-mentioned transmission resonance phenomenon in conjunction with the dash panel.

However, the second layer is stacked as the perforated layer on the intermediate layer so as to face the first layer made of the porous material through the intermediate layer which is the non-air permeable thin-membrane layer or the air permeable thin-membrane layer having the plurality of opening portions.

Accordingly, in the laminated structure of the intermediate layer and the second layer, the corresponding portion of the intermediate layer to the layer portion of the perforated layer occurs deviation in phase of vibrations in between the corresponding portion of the intermediate layer to the perforated portion of the perforated layer.

Thus, even when the soundproof body tends to cause the transmission resonance phenomenon at the intermediate layer and the first layer together with the plate-shaped member in the low-frequency range of the noises, as described above, the transmission resonance phenomenon can be favorably suppressed based on the deviation in phase of vibrations between the intermediate layer and the perforated layer.

As a result, the silencer for the motor vehicle suppresses the transmission resonance phenomenon which tends to occur in the low-frequency range of the noises in relation to the plate-shaped member, thereby to be able to provide as the dash silencer capable of achieving further reduction in weight as compared with a conventional dash silencer and of favorably performing soundproofing of noises over a wide frequency range from a low-frequency range to a high-frequency range of the noises.

According to an aspect of the present invention, in the silencer for the motor vehicle, the plate-shaped member in the vehicle body of the motor vehicle is a back panel configured to separate a cargo bed and a vehicle compartment from each other in a vehicle body of a truck, and the soundproof body is mounted, as a back panel silencer, at the first layer on the back panel from the inside of the vehicle compartment.

Herein, the soundproof body is mounted at the first layer on the back panel. Consequently, the soundproof body constructs the three-layer structure tending to cause the transmission resonance phenomenon, as described above, with the back panel, the first layer equivalent to the air layer, and the intermediate layer equivalent to the non-air permeable thin-membrane layer or the air permeable thin-membrane layer having the plurality of opening portions.

However, even when the soundproof body tends to cause the transmission resonance phenomenon at the intermediate layer and the first layer together with the back panel in the low-frequency range of the noises, the transmission resonance phenomenon can be favorably suppressed based on the above-mentioned deviation in phase of vibrations between the intermediate layer and the perforated layer.

Consequently, the silencer for the motor vehicle can favorably perform soundproofing of noises propagating from a rear wheel or the cargo bed of the motor vehicle through the back panel as the back panel silencer.

BRIEF DESCRIPTION OF THE DRAWINGS

Other features and advantages of the invention will be apparent from the following description taken in connection with the accompanying drawings.

DETAILED DESCRIPTION OF THE PREFERRED EMBODIMENTS

Hereinafter, each embodiment of the present invention will be described below, referring to the attached drawings.

Figure 1:
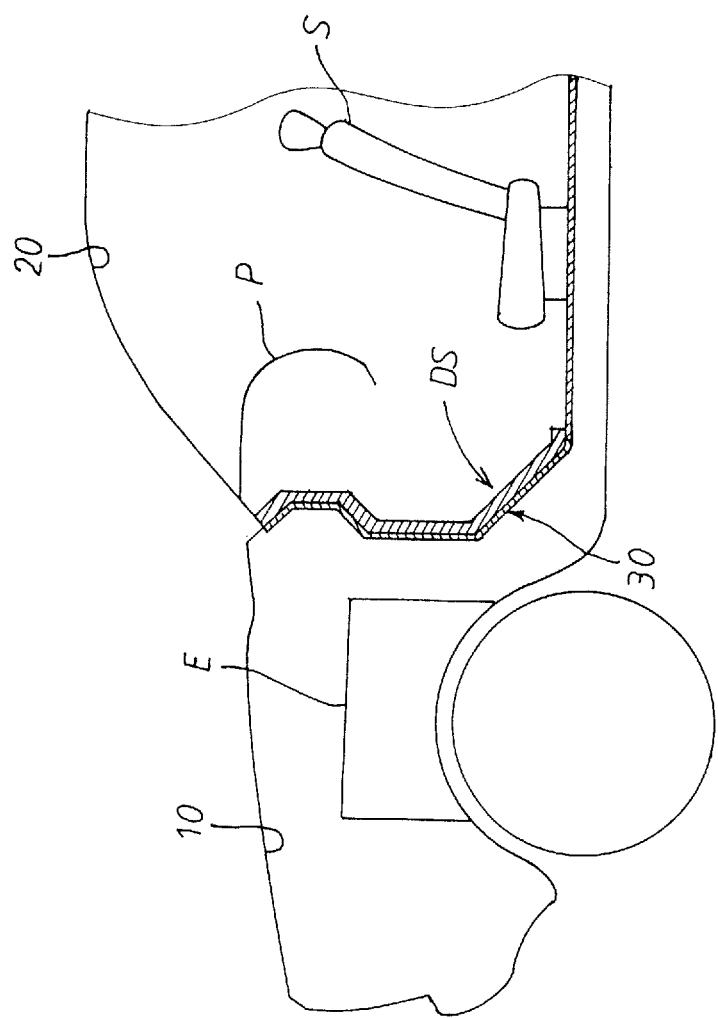
FIG. 1 indicates a partial diagrammatic sectional view schematically illustrating an motor vehicle to which a first embodiment of a silencer for vehicles according to the present invention is applied.

FIG. 1 illustrates a first embodiment of the present invention. In the first embodiment, the present invention is applied to a motor vehicle as an example of vehicles. The motor vehicle includes an engine room 10 and a compartment 20. In the motor vehicle, the vehicle compartment 20 is provided on a rear side of the engine room 10. The engine room 10 has an engine E disposed therein. The vehicle compartment 20 has a front seat S disposed therein.

The motor vehicle also includes a dash panel 30 (referred to as a dashboard 30). The dash panel 30 has a curved shape in longitudinal section as illustrated in FIG. 1. The dash panel 30 is disposed on a boundary between the engine room 10 and the vehicle compartment 20 to separate the engine room 10 and the vehicle compartment 20 from each other.

In the first embodiment, the dash panel 30 is made of a steel plate having a thickness of 0.8 (mm). The dash panel 30 has an extended upper end connected to a lower edge of a front windshield of the vehicle compartment 20. The dash panel 30 also has an extended lower end connected to a front edge of a floor wall of the vehicle compartment 20.

The motor vehicle also includes a dash silencer DS. The dash silencer DS has a curved shape in longitudinal section as illustrated in FIG. 1 as in the shape of the dash panel 30. The dash silencer DS is assembled along the dash panel 30 from the vehicle compartment 20. In the first embodiment, the dash silencer DS has a contour shape (see FIG. 3) which is substantially identical with that of the dash panel 30.

Figure 2:
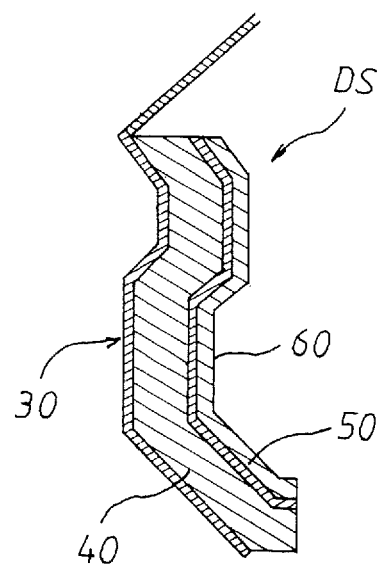
FIG. 2 indicates an enlarged longitudinal sectional view illustrating a dash silencer in FIG. 1.
Figure 3:
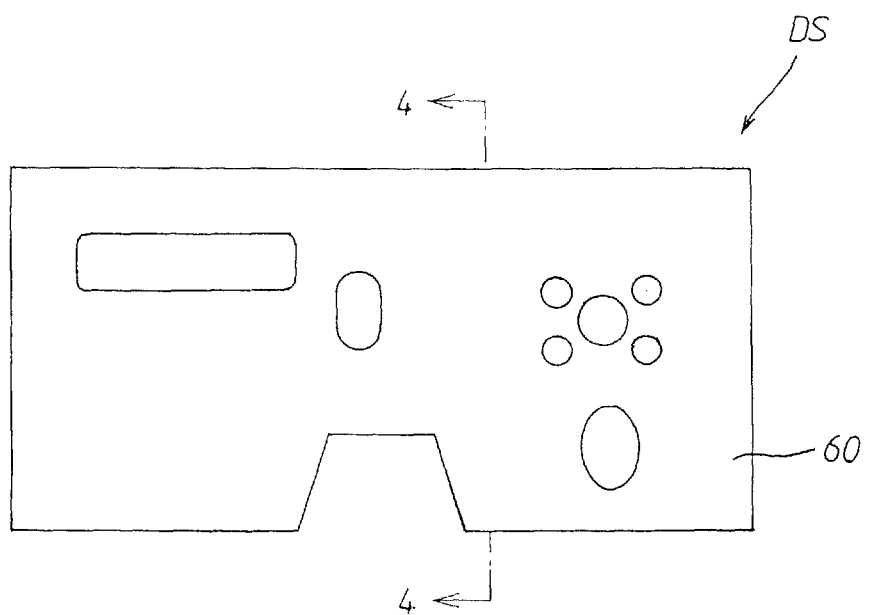
FIG. 3 indicates an enlarged front view illustrating the dash silencer in FIG. 1.
Figure 4:
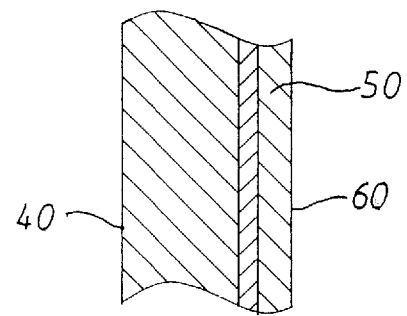
FIG. 4 indicates an enlarged partial sectional view illustrating the dash silencer taken along line 4-4 in FIG. 3.

As illustrated in FIGS. 2, 3, and 4, the dash silencer DS includes a one-side layer 40, an intermediate layer 50, and an other-side layer 60. The one-side layer 40, the intermediate layer 50, and the other-side layer 60 are stacked in this order from a front side to a rear side of the motor vehicle. In addition, FIG. 1 also illustrates an instrument panel P.

The one-side layer 40 is formed from a predetermined porous material to act a role as a sound absorption layer having a volume density (e.g., 0.05 (g/cm$^3$)) within a predetermined volume density range, a basis weight (e.g., 1000 (g/m$^2$)) within a predetermined basis weight range, and a thickness (e.g., 20 (mm)) within a predetermined thickness range. Herein, the one-side layer 40 is formed along the dash panel 30 in longitudinal section as illustrated in FIG. 2.

In the first embodiment, felt is adopted as the above-mentioned predetermined porous material. The predetermined volume density range is set in 0.03 (g/cm$^3$) to 0.1 (g/cm$^3$). The predetermined basis weight range is set in 100 (g/m$^2$) to 1600 (g/m$^2$). The predetermined thickness range is set in 3 (mm) to 65 (mm).

The intermediate layer 50 is formed as a non-air permeable thin-membrane layer along the one-side layer 40 in the form of a longitudinal section curved shape like the shape of the one-side layer 40 (see FIG. 2 and FIG. 3). The intermediate layer 50 is sandwiched between the one-side layer 40 and the other-side layer 60.

Figure 5:
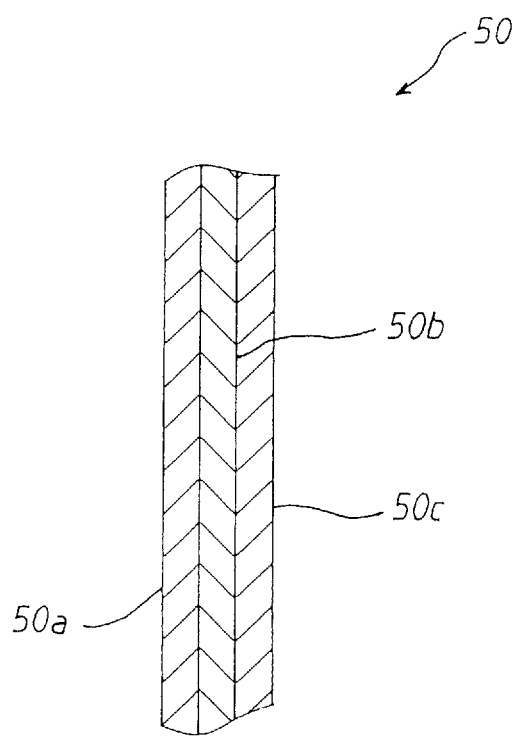
FIG. 5 indicates an enlarged partial sectional view illustrating an intermediate layer of the dash silencer in FIG. 2.

As illustrated in FIG. 5, the intermediate layer 50 is formed by laminating a one-side fusion film 50a, a barrier film 50b, and an other-side fusion film 50c. The one-side fusion film 50a is made of a predetermined thermoplastic material for a one-side fusion film with a predetermined thickness. The one-side fusion film 50a is fused at a front surface to the one-side layer 40 along a rear surface thereof.

In the first embodiment, the predetermined thickness of the one-side fusion film 50a is set in 20 (μm). Polyethylene is adopted as the predetermined thermoplastic material for one-side fusion film.

The barrier film 50b is formed from a predetermined thermoplastic material for a barrier film with a predetermined thickness. The barrier film 50b is fused at its front surface to the one-side fusion film 50a along a rear surface thereof.

In the first embodiment, the predetermined thickness of the barrier film 50b is set in 15 (μm). Nylon is adopted as the predetermined thermoplastic material for the barrier film.

The reason why nylon is adopted as the formation material of the barrier film 50b in the first embodiment is based on the fact that nylon is higher in melting point than polyethylene which is the formation material of the one-side fusion film 50a, as previously described.

The other-side fusion film 50c is formed from a predetermined thermoplastic material for an other-side fusion film with a predetermined thickness (20 (μm)) similar to the thickness of the one-side fusion film 50a. The other-side fusion film 50c is fused at its front surface to the barrier film 50b along a rear surface thereof.

In the first embodiment, polyethylene is adopted as the predetermined thermoplastic material for the other-side fusion film similarly to the predetermined thermoplastic material for the one-side fusion film.

In the case where the one-side fusion film 50a, the barrier film 50b, and the other-side fusion film 50c are stacked and fused to each other as described above, a temperature for heating the one-side fusion film 50a, the barrier film 50b, and the other-side fusion film 50c is set to be lower than the melting point of nylon and higher than the melting point of polyethylene.

Thus, the one-side fusion film 50a, the barrier film 50b, and the other-side fusion film 50c can be fused to each other without melting the barrier film 50b.

In the first embodiment, the intermediate layer 50 has a thickness within a predetermined thickness range. A sum of each of the thickness of the one-side fusion film 50a, the barrier film 50b, and the other-side fusion film 50c is 55 (μm). In the first embodiment, the predetermined thickness range of the intermediate layer 50 is set in 25 (μm) to 80 (μm).

The other-side layer 60 is formed from a predetermined porous material with a volume density of 0.12 (g/cm$^3$) within a predetermined volume density range, a thickness of 5 (mm) within a predetermined thickness range, and a basis weight of 600 (g/m$^2$) within a predetermined basis weight range in the form of a longitudinal section curved shape like the intermediate layer 50 along the intermediate layer 50. As illustrated in FIG. 2, the other-side layer 60 is stacked along the intermediate layer 50 so as to face the one-side layer 40 through the intermediate layer 50.

In the first embodiment, the predetermined volume density range of the other-side layer 60 is set in 0.1 (g/cm$^3$) to 0.4 (g/cm$^3$). The predetermined thickness range of the other-side layer 60 is set in 3 (mm) to 15 (mm). The predetermined basis weight range of the other-side layer 60 is set in 100 (g/m$^2$) to 1600 (g/m$^2$). In addition, the total thickness as the dash silencer DS is approximately 25 (mm).

Figure 6:
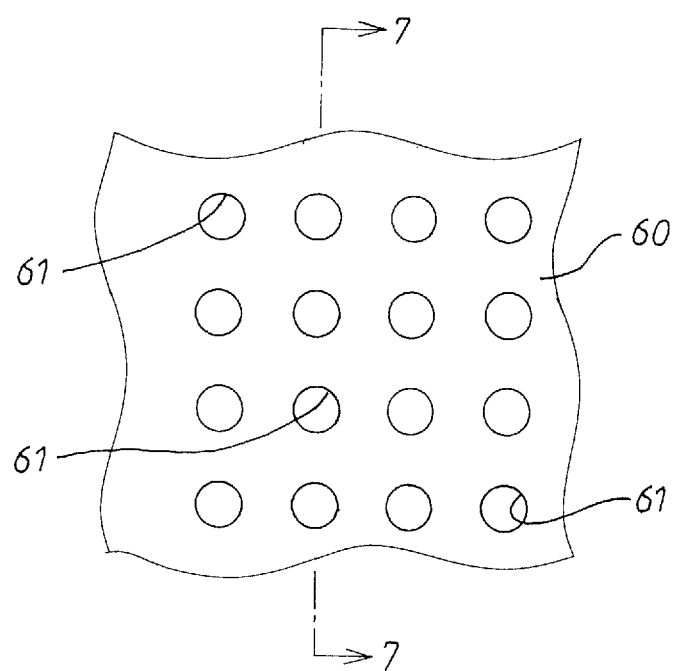
FIG. 6 indicates a partially enlarged front view illustrating a second layer in FIG. 3.
Figure 7:
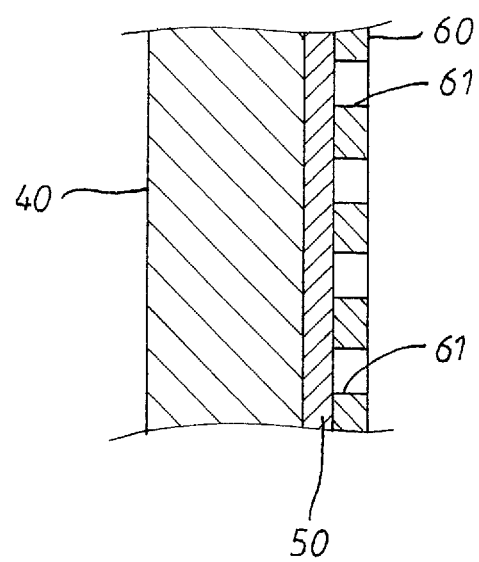
FIG. 7 indicates an enlarged sectional view taken along line 7-7 of FIG. 6.

The other-side layer 60 is constructed as a perforated layer (hereinafter, referred to as a perforated layer 60). As illustrated in FIG. 6 or FIG. 7, the perforated layer has a plurality of opening portions 61 which are respectively formed penetratingly in the other-side layer 60 along a thickness direction thereof in the form of a transverse section circular shape.

Herein, the plurality of the opening portions 61 are formed respectively over the entire surface of the other-side layer 60 in a dispersed state at an opening ratio of 25(%) within a predetermined opening ratio range and an opening diameter of 40 (mm) within a predetermined opening diameter range.

In the first embodiment, the predetermined opening ratio and opening diameter ranges are set respectively in 5(%) to 50(%) and 10 (mm) to 80 (mm) such that noises having a frequency within a frequency range (200 (Hz) to 6300 (Hz)) required in the dash silencer DS can be favorably absorbed by the membrane vibration of the intermediate layer 50 and the porous sound absorption function of the perforated layer 60 made of the porous material.

In the first embodiment, when the opening ratio of each opening portion 61 deviates from the predetermined opening ratio range of 5(%) to 50(%) or when the opening diameter of each opening portion 61 deviates from the predetermined opening diameter range of 10 (mm) to 80 (mm), the perforated layer 60 cannot favorably exert the porous sound absorption function.

In addition, the opening ratio within the above-described predetermined opening ratio range is a ratio of a sum of the opening areas of all the opening portions 61 to the entire surface area of the other-side layer 60.

Herein, a description will be given about the grounds that the intermediate layer 50 is formed as a non-air permeable thin-membrane layer and the other-side layer 60 is formed as a perforated layer in the first embodiment.

As described above, the dash silencer DS is disposed on and supported by the dash panel 30 at the one-side layer 40. In the dash silencer DS, the one-side layer 40 and the intermediate layer 50 form a three-layer structure in conjunction with the dash panel 30. In this case, the three-layer structure is constructed by sandwiching the one-side layer 40 between the intermediate layer 50 and the dash panel 30.

And, the one-side layer 40 is made of a porous material, and therefore is equivalent to an air layer. Moreover, the intermediate layer 50 is a non-air permeable thin-membrane layer, as described above. Accordingly, the above-mentioned three-layer structure is constructed by sandwiching the one-side layer 40 equivalent to the air layer between the intermediate layer 50 equivalent to the non-air permeable thin-membrane layer and the dash panel 30.

For this reason, when in a process in which noises are incident on the one-side layer 40 and the intermediate layer 50 through the dash panel 30 the dash panel 30 receives variations in sound pressure of the noises and vibrates, the one-side layer 40 exerts spring action like the air layer to the vibrations.

Accordingly, the intermediate layer 50 receives the spring action of the one-side layer 40 and vibrates together with the dash panel 30. At this time, the intermediate layer 50 equivalent to the non-air permeable thin-membrane layer and the one-side layer 40 made of the porous material entirely vibrate in conjunction with the dash panel 30, based on the variations in sound pressure of the noises.

Consequently, the intermediate layer 50 and the one-side layer 40 tend to cause a transmission resonance phenomenon in conjunction with the dash panel 30 in a low-frequency range of noises.

However, the other-side layer 60 is stacked on the intermediate layer 50 so as to face the one-side layer 40 through the intermediate layer 50. Therefore, when the intermediate layer 50 entirely vibrates in conjunction with the one-side layer 40 and the dash panel 30 as described above, the other-side layer 60 receives the vibrations of the intermediate layer 50.

Here, because the other-side layer 60 is the perforated layer, the other-side layer 60 is constructed by a layer portion and a perforated portion. Accordingly, the intermediate layer 50 constructs a two-layer structure at a corresponding portion thereof to the layer portion of the perforated layer 60 together with the layer portion of the perforated layer 60. On the other hand, the intermediate layer 50 forms a single-layer structure at a corresponding portion thereof to the perforated portion of the perforated layer 60.

Therefore, when the other-side layer 60 receives the vibrations of the intermediate layer 50 as described above, the perforated portion of the perforated layer 60 and the corresponding portion of the intermediate layer 50 to the perforated portion vibrate in accordance with the vibrations of the intermediate layer 50 since only the corresponding portion of the intermediate layer 50 forms the single-layer structure.

On the other hand, the layer portion of the perforated layer 60 and the corresponding portion of the intermediate layer 50 to the layer portion vibrate with deviation in phase from the vibrations of the single-layer structure since they form the two-layer structure.

In other words, in the two-layer structure of the intermediate layer 50 and the other-side layer 60, there occurs vibrations with deviation of phase between the corresponding portion of the intermediate layer 50 to the layer portion of the perforated layer equivalent to the other-side layer 60 and the corresponding portion of the intermediate layer 50 to the perforated portion of the perforated layer equivalent to the other-side layer 60 from each other.

Therefore, even when the intermediate layer 50 and the one-side layer 40 of the dash silencer DS tend to cause a transmission resonance phenomenon in conjunction with the dash panel 30 in a low-frequency range of noises, the transmission resonance phenomenon can be favorably suppressed based on deviation in phase of vibrations between the intermediate layer 50 and the other-side layer equivalent to the perforated layer. In the first embodiment, the low-frequency range of noises is a frequency range of 200 (Hz) to 500 (Hz).

And, the other-side layer 60 is formed as the perforated layer. Thus, the basis weight of the other-side layer 60 is smaller than a basis weight of an other-side layer having no perforated structure. Moreover, the intermediate layer 50 is formed as the non-air permeable thin-membrane layer, and therefore is light in weight.

From the above descriptions, in the first embodiment, the intermediate layer 50 is formed as the non-air permeable thin-membrane layer and the other-side layer 60 is formed as the perforated layer.

In the first embodiment constructed as described above, when the engine E is started to generate engine sound as noises, the noises are incident on the dash silencer DS through the dash panel 30.

Herein, the dash panel 30 is made of a steel plate. Therefore, the noises incident on the dash panel 30 are partially insulated by the dash panel 30 under the non-air permeability thereof, and then are incident on the dash silencer DS.

When in such a manner the noises are incident on the dash silencer DS, the noises are incident on the one-side layer 40 adjacent to the dash panel 30. Herein, the one-side layer 40 acts a role as the sound absorption layer made of felt which is the predetermined porous material, as previously described. Thus, the noises incident on the one-side layer 40 are partially absorbed by the one-side layer 40 under the air permeability thereof, and then are incident on the intermediate layer 50 through the one-side layer 40.

The noises partially absorbed by the one-side layer 40 are incident on the intermediate layer 50 through the one-side layer 40. Here, the intermediate layer 50 is the non-air permeable thin-membrane layer which is formed by laminating the one-side fusion film 50a, the barrier film 50b, and the other-side fusion film 50c, as described above.

Consequently, the noises incident on the intermediate layer 50, as described above causes membrane vibrations in the intermediate layer 50 in accordance with variations of level in its sound pressure. Thus, the intermediate layer 50 consumes the energy of the incident noises by the membrane vibrations thereof.

In other words, the noises incident on the intermediate layer 50 are favorably reduced in such a manner that the one-side fusion film 50a, the barrier film 50b, and the other-side fusion film 50c sequentially consume the energy under the respective membrane vibrations.

This means that the intermediate layer 50 insulates favorably the noises from the one-side layer 40 as the non-air permeable thin-membrane layer shields.

The noises insulated by the intermediate layer 50 in such a manner are incident on the other-side layer 60 through the intermediate layer 50. Accordingly, the other-side layer 60 vibrates in accordance with the membrane vibrations of the intermediate layer 50 based on the variations of level in sound pressure of the noises toward the vibrating direction of the membrane vibrations of the intermediate layer 50.

Herein, the other-side layer 60 is the perforated layer made of the predetermined porous material, as described above. Accordingly, the noises incident on the other-side layer 60 is reduced by the other-side layer 60 with the felt which is the formation material of the other-side layer 60.

Moreover, the noises incident on the other-side layer 60 are reduced based on the frictional contact with an inner circumferential surface portion of each opening portion 61 in the process in which the noises pass through each opening portion 61 of the other-side layer 60.

Since in the dash silencer DS the one-side layer 40 is formed from the porous material, as described above, the one-side layer 40 is equivalent to the air layer. Moreover, the intermediate layer 50 is the non-air permeable thin-membrane layer, as described above.

Consequently, the three-layer structure of the dash panel 30, the one-side layer 40, and the intermediate layer 50 is constructed by sandwiching the one-side layer 40 equivalent to the air layer between the intermediate layer 50 equivalent to the non-air permeable thin-membrane layer and the dash panel 30.

From this reason, the one-side layer 40 exerts the spring action like the air layer to the variations or fluctuations in sound pressure of noises. Thus, the dash panel 30, the one-side layer 40, and the intermediate layer 50 entirely vibrate together based on the variations in sound pressure of the noises.

Thus, the intermediate layer 50 and the one-side layer 40 are susceptible to the transmission resonance phenomenon together with the dash panel 30 in the low-frequency range of noises.

However, since the other-side layer 60 stacked on the intermediate layer 50 is the perforated layer, as described above, the perforated portion of the perforated layer and the corresponding portion of the intermediate layer 50 to the perforated portion of the perforated layer form the single-layer structure of only the corresponding portion of the intermediate layer 50. Thus, when the other-side layer 60 receives vibrations of the intermediate layer 50, the other-side layer 60 vibrates in accordance with the vibrations of the intermediate layer 50.

On the other hand, the layer portion of the perforated layer equivalent to the other-side layer 60 and the corresponding portion of the non-air permeable thin-membrane layer equivalent to the intermediate layer 50 to the layer portion of the perforated layer equivalent to the other-side layer 60 form the two-layer structure, thereby to perform vibrations with deviation in phase from the vibrations of the single-layer structure.

Therefore, even when the dash silencer DS tends to cause the transmission resonance phenomenon at the intermediate layer 50 and the one-side layer 40 together with the dash panel 30 in the low-frequency range of noises, the transmission resonance phenomenon can be favorably suppressed based on the deviation in phase which is generated between the intermediate layer 50 and the other-side layer 60.

This means that the noises incident on the dash silencer DS through the dash panel 30 can be favorably absorbed and insulated over the wide range of the low-frequency range to the high-frequency range without occurrence of the transmission resonance phenomenon in the low-frequency range of noises, on a basis of the lamination structure of the intermediate layer 50 equivalent to the non-air permeable thin-membrane layer and the other-side layer 60 equivalent to the perorated layer.

As described above, in the first embodiment, the dash silencer DS is formed to have the above-mentioned construction. Thus, even when the dash silencer DS tends to cause the transmission resonance phenomenon at the intermediate layer 50 and the one-side layer 40 in conjunction with the dash panel 30 in the low-frequency range of noises, the transmission resonance phenomenon can be favorably suppressed based on the deviation in phase of vibrations between the non-air permeable thin-membrane layer equivalent to the intermediate layer 50 and the perforated layer equivalent to the other-side layer 60.

This means that degradation in sound absorption performance of the dash silencer DS owing to the transmission resonance phenomenon tending to occur in the low-frequency range of noises can be favorably suppressed based on the deviation in phase of vibrations between the intermediate layer 50 and the other-side layer 60.

Accordingly, the dash silencer DS suppresses the transmission resonance phenomenon, which tends to occur in the low-frequency range of the noises, in relation to the dash panel 30, as described above, thereby to be able to be provided as a dash silencer for a motor vehicle capable of performing favorably soundproofing of noises over a wide frequency range of a low-frequency range to high-frequency range of the noises.

As a result, even when engine sound from the engine room 10 is incident as noises on the dash silencer DS, the noises are favorably insulated and absorbed over the low-frequency range to the high-frequency range. This means that the dash silencer DS can favorably achieve the effect of performing soundproofing of the engine sound over the low-frequency range to the high-frequency range of the noises.

As described above, since the other-side layer 60 is the perforated layer, the basis weight of the other-side layer 60 is smaller than a basis weight of an other-side layer having no perorated structure.

Moreover, since the intermediate layer 50 is the non-air permeable thin-membrane layer, the intermediate layer 50a is light in weight. Accordingly, the dash silencer DS of the one-side layer 40, the intermediate layer 50, and the other-side layer 60 is suitable for reducing the weight as the dash silencer.

Incidentally, Using the dash silencer DS as constructed above as a working example 1, a transmission sound loss characteristic of the working example 1 was measured by a transmission sound loss test in relation to a frequency of noises. For the measurement, comparative examples 1 and 2 were prepared, and transmission sound loss characteristics of the comparative examples 1 and 2 were measured by the transmission sound loss test in relation to the frequency of noises.

In addition, a transmission sound loss of the transmission sound loss characteristic is a difference between incident sound and transmission sound. As the difference is smaller, the transmission sound becomes larger, so that the transmission sound loss is low and the sound insulation performance is poor.

As the difference is greater, the transmission sound becomes smaller, so that the transmission sound loss is high and the sound insulation performance is good. Accordingly, as the transmission sound loss is higher, the acoustic sensitivity becomes lower. As the transmission sound loss is lower, the acoustic sensitivity becomes higher.

Herein, the comparative example 1 is made of a steel plate with a thickness of 0.8 (mm). The comparative example 2 has a two-layer structure of the one-side layer and the other-side layer other than the intermediate layer of the working example 1.

In the comparative example 2, the one-side layer is formed from felt at a thickness of 20 (mm) and a basis weight of 1000 ($g/m^2$), and the other-side layer is formed from felt at a thickness of 5 (mm) and a basis weight of 1400 ($g/m^2$).

Additionally, the comparative example 2 has a thickness of 25 (mm). In the comparative example 2, the one-side layer has a volume density of 0.05 ($g/cm^3$) which is similar to that of the working example 1, and the other-side layer has a volume density of 0.24 ($g/cm^3$) which is similar to that of the working example 1.

Figure 8:
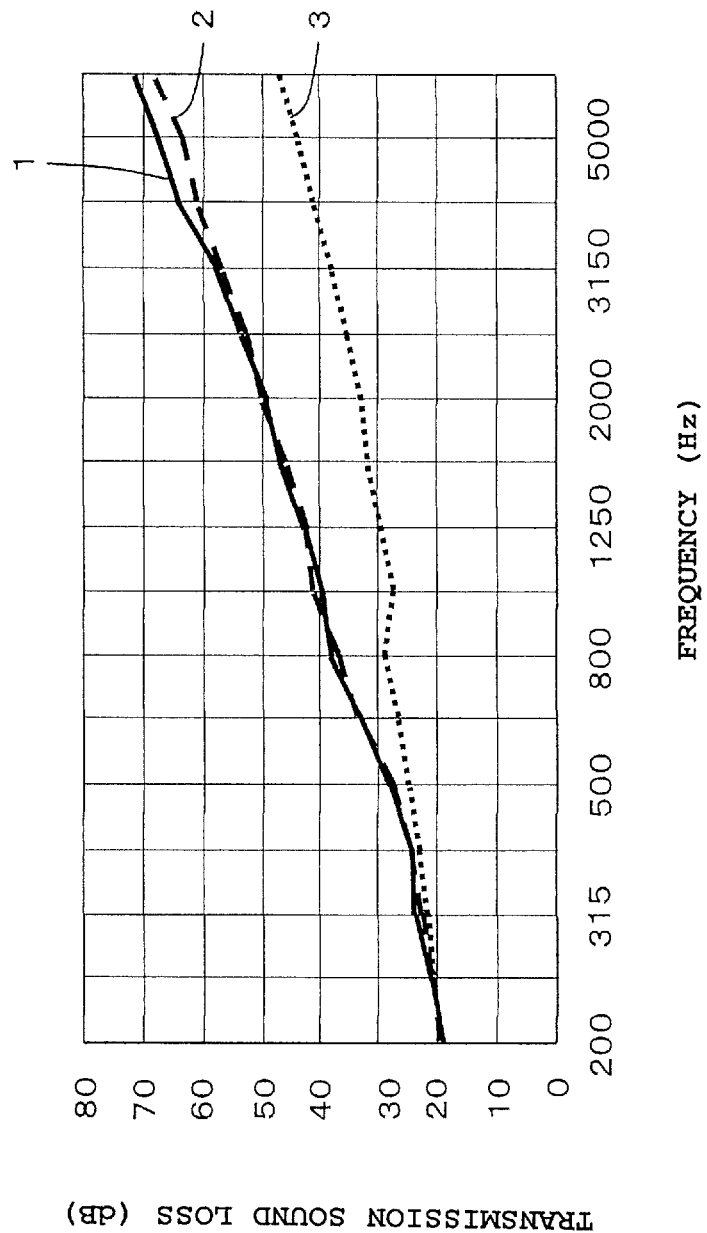
FIG. 8 is a graph showing a relation between a transmission sound loss characteristic and a frequency of noise with regard to a working example and comparative examples in the first embodiment.

As a result of the transmission sound loss characteristics of the working example 1, comparative example 1 and comparative example 2, graphs 1 to 3 were obtained respectively as line graphs shown in FIG. 8.

The graph 1 represents the transmission sound loss characteristic of the working example 1. The graph 2 represents the transmission sound loss characteristic of the comparative example 2, and the graph 3 represents the transmission sound loss characteristic of the comparative example 1.

It is apparent from the graph 1 that the transmission sound loss is not degraded in the low-frequency range of the noises. This is based on the following reasons.

In the working example 1, the intermediate layer 50 interposed between the one-side layer 40 and the other-side layer 60 is the non-air permeable layer, as described above. Thus, the intermediate layer 50 does not function as the air layer.

Accordingly, even when noises are incident on the intermediate layer 50, the intermediate layer 50 performs membrane vibrations in accordance with variations in level of sound pressure of the noises without exerting the spring action like the air layer.

As a result, the other-side layer 60 also vibrates in accordance with the membrane vibrations of the intermediate layer 50.

Herein, since the intermediate layer 50 is very thinner in thickness than the other-side layer 60 and very lighter in weight than the other-side layer 60, the intermediate layer 50 and the other-side layer 60 are different in their natural frequencies from each other.

Accordingly, the intermediate layer 50 and the other-side layer 60 are different in vibration manner from each other, and therefore do not resonate with each other.

As is seen from the comparison between graphs 1 and 2, the working example 1 exerts a transmission sound loss characteristic substantially similar to a transmission sound loss characteristic of the comparative example 2 over 200 (Hz) to 5000 (Hz) in the entire frequency range of the noises.

But, in the working example 1, when the one-side layer 40 is disposed along the dash panel 30, the one-side layer 40 functions as the air layer as described above.

Accordingly, when noises from the engine room 10 is incident on the working example 1 through the dash panel 30, the transmission resonance phenomenon, which tends to occur in relation to the low-frequency range of the noises in the three-layer structure of the dash panel 30, the one-side layer 40 equivalent to the air layer, and the intermediate layer 50 equivalent to the non-air permeable thin-membrane layer, can be favorably suppressed by the laminated structure of the intermediate layer 50 equivalent to the non-air permeable thin-membrane layer and the other-side layer 60 equivalent to the perforated layer, as described above.

As a result, even when the working example 1 is disposed along the dash panel 30 as described above, the working example 1 can favorably suppress the transmission resonance phenomenon which tends to occur in relation to the low-frequency range of the noises, and can vibrate at the one-side layer 40, the intermediate layer 50, and the other-side layer 60 without producing resonance according to the membrane vibrations of the intermediate layer 50.

The other-side layer 60 of the working example 1 is the perforated layer as constructed above. On the other hand, the second layer of the comparative example 2 is an air permeable layer, but has no opening portions unlike the other-side layer 60. Therefore, the basis weight of the other-side layer 60 of the working example 1 is smaller than the basis weight of the other-side layer of the comparative example 2.

In other words, although the dash silencer DS of the working example 1 is much lighter in weight than the comparative example 2, the dash silencer DS of the working example 1 can exert the transmission sound loss characteristic similar substantially to the transmission sound loss characteristic of the comparative example 2, while favorably suppressing the transmission resonance phenomenon which tends to occur in relation to the low-frequency range of the noises.

It is apparent from the graph 3 that the transmission sound loss characteristic of the working example 1 is more excellent than the transmission sound loss characteristic of the comparative example 1.

Furthermore, each of sound absorption coefficient characteristics of the working example 1 and comparative example 2 was measured by a reverberation chamber method sound absorption coefficient test in relation to the frequency of the noises.

Figure 9:
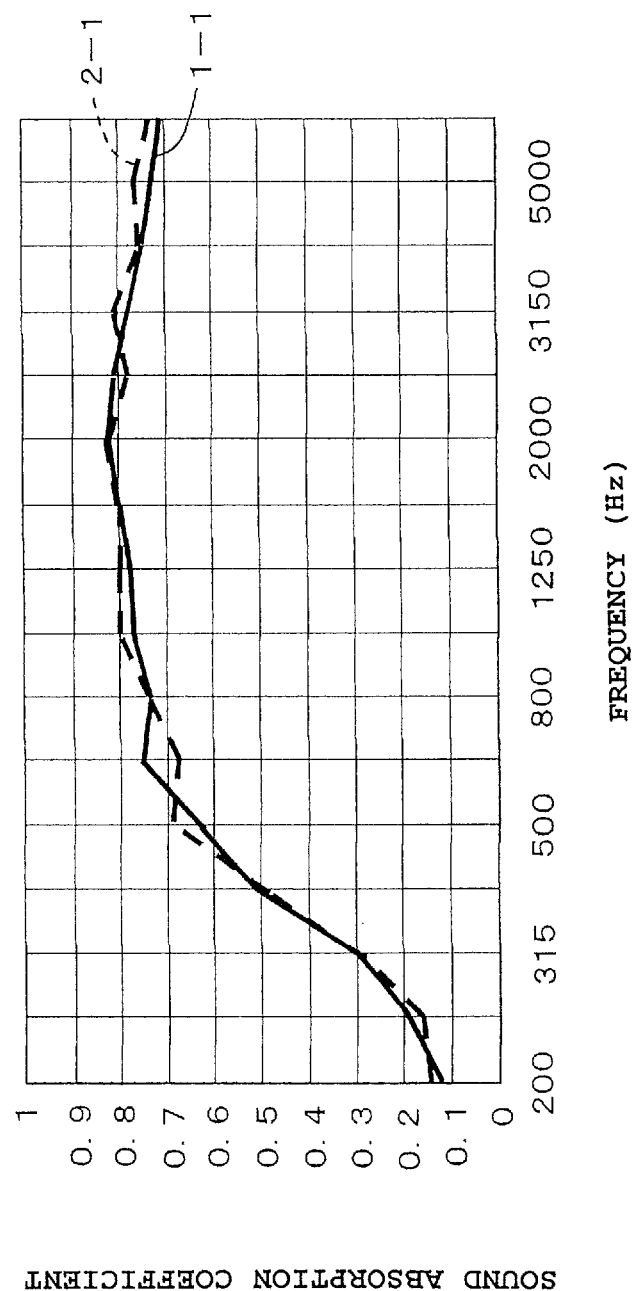
FIG. 9 is a graph showing a relation between a sound absorption coefficient characteristic and the frequency of the noise with regard to the working example and the comparative examples in the first embodiment.

Accordingly, graphs 1-1 and 2-1 are respectively line graphs showing in FIG. 9. Here, the graph 1-1 represents the sound absorption coefficient characteristic of the working example 1. The graph 2-1 represents the sound absorption coefficient characteristic of the comparative example 2.

It is apparent from the comparison between the graphs 1-1 and 2-1 that the sound absorption coefficient characteristic of the working example 1 is substantially similar to the sound absorption coefficient characteristic of the comparative example 2.

In other words, It is apparent that although the dash silencer DS of the working example 1 is much lighter in weight than the comparative example 2 as described above, the dash silencer DS of the working example 1 can exert the sound absorption coefficient which is substantially similar to the sound absorption coefficient characteristic of the comparative example 2.

Moreover, In addition to the working example 1, the inventors of the present invention prepared a plurality of dash silencers by changing the mass of the other-side layer and the opening ratio of each opening portion. Measurement similar to that described above was performed for the respective dash silencers.

As a result, the inventors of the present invention have found that when the other-side layer 60 has the volume density of 0.1 (g/cm$^3$) to 0.4 (g/cm$^3$), the thickness of (mm) to 15 (mm), the basis weight of 100 (g/m$^2$) to 1600 (g/m$^2$), and the opening ratio of 5(%) to 50(%), each of the dash silencers can favorably exert a soundproofing effect substantially similar to that of the dash silencer DS of the working example 1.

Figure 10:
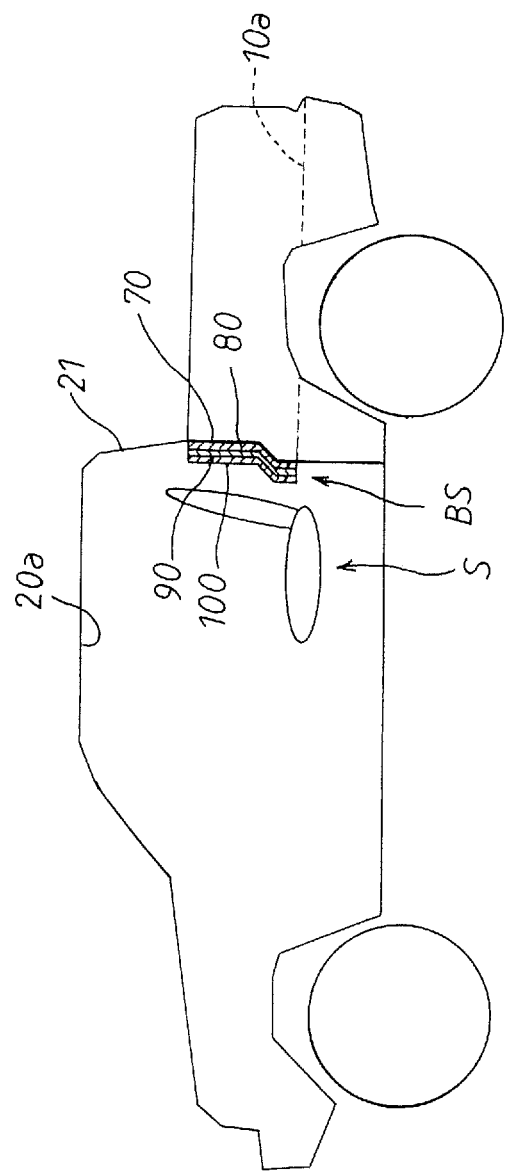
FIG. 10 indicates a diagrammatic sectional view schematically illustrating a truck to which a second embodiment of a silencer for vehicles according to the present invention is applied.

FIG. 10 illustrates a second embodiment of the present invention. In the second embodiment, the present invention is applied to a truck. The truck includes aback panel 70 (referred to as a back board 70).

The back panel 70 is formed to have a longitudinal section curved shape, as illustrated in FIG. 10. The back panel 70 is provided on a boundary between a compartment 20a and a cargo bed 10a in the truck to separate the cargo bed 10a and the compartment 20a from each other.

In addition, in the second embodiment, the back panel 70 is made of a steel plate with a thickness of 0.8 (mm) similar to the dash panel 30 described in the first embodiment. As illustrated in FIG. 10, the reference number 21 denotes a rear glass window, and the reference number S denotes a seat in the compartment 20a.

Figure 11:
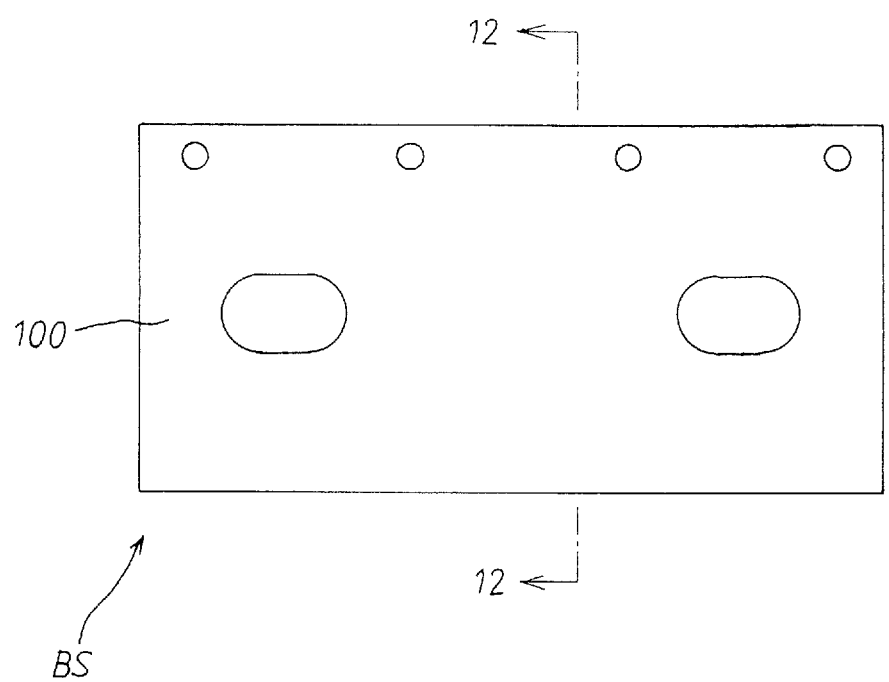
FIG. 11 indicates an enlarged front view illustrating a back panel silencer in FIG. 10.

As illustrated in FIG. 10, the truck includes a back panel silencer BS. The back panel silencer BS is assembled along the back panel 70 from the compartment 20a in a curved shape longitudinal section similar to that of the back panel 70. In addition, in the second embodiment, the back panel silencer BS has a contour shape (see FIG. 11) substantially identical with a contour shape of the back panel 70.

Figure 12:
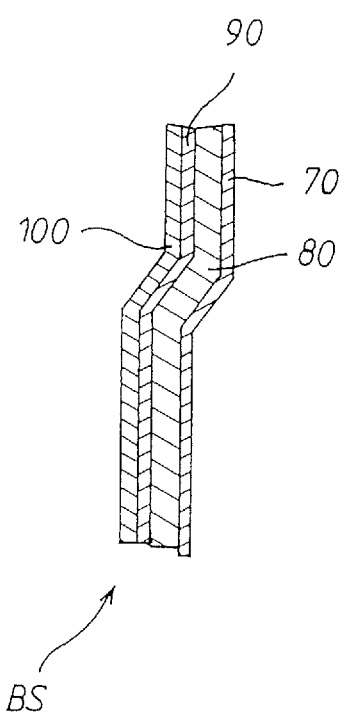
FIG. 12 indicates an enlarged partial sectional view illustrating the back panel silencer in FIG. 10.

As illustrated in FIGS. 10 and 12, the back panel silencer BS includes a one-side layer 80, an intermediate layer 90, and an other-side layer 100 corresponding respectively to the one-side layer 40, the intermediate layer 50, and the other-side layer 60 of the dash silencer DS described in the first embodiment. The one-side layer 80, the intermediate layer 90, and the other-side layer 100 are stacked in this order from a rear side to a front side of the truck.

The one-side layer 80 is formed along the back panel 70 in a longitudinal section curved shape shown in FIG. 12 with a material similar to that of the one-side layer 40 at a volume density, a basis weight, and a thickness which are similar to those of the one-side layer 40 in order to serve as a sound absorption layer as the same as the one-side layer 40 described in the first embodiment, The intermediate layer 90 is formed as a non-air permeable thin-membrane layer, which is similar to the intermediate layer 50 described in the first embodiment.

As illustrated in FIG. 12, the intermediate layer 90 has a longitudinal section curved shape similar to that of the one-side layer 40, and is formed along the one-side layer 80. The intermediate layer 90 is sandwiched between the one-side layer 80 and the other-side layer 100 (see FIG. 12).

In the second embodiment, the intermediate layer 90 has a longitudinal section curved shape which is different from the intermediate layer curved shape of the intermediate layer 50 described in the first embodiment. However, the intermediate layer 90 is formed by laminating a one-side fusion film, a barrier film, and an other-side fusion film (not illustrated) corresponding respectively to the one-side fusion film 50a, the barrier film 50b, and the other-side fusion film 50c of the intermediate layer 50.

In the intermediate layer 90, the one-side fusion film is formed from a material similar to that of the one-side fusion film 50a described in the first embodiment with a thickness similar to that of the one-side fusion film 50a. The one-side fusion film is fused at its rear surface to the one-side layer 80 along a front surface thereof.

In the intermediate layer 90, the barrier film is formed from a material similar to that of the barrier film 50b described in the first embodiment with a thickness similar to that of the barrier film 50b. The barrier film is fused at its rear surface to the one-side fusion film 50a along a front surface thereof.

Furthermore, in the intermediate layer 90, the other-side fusion film is formed from a material similar to that of the other-side fusion film 50c described in the first embodiment with a thickness similar to that of the other-side fusion film 50c. The other-side fusion film is fused at its rear surface to the barrier film along a front surface thereof.

The other-side layer 100 is formed from a material similar to that of the other-side layer 60 described in the first embodiment with a volume density, a thickness, and a basis weight similar to those of the other-side layer 60 in a longitudinal section shape similar to that of the intermediate layer 90.

As illustrated in FIG. 12, the other-side layer 100 is stacked along the intermediate layer 90 so as to face the one-side layer 80 through the intermediate layer 90.

Herein, the other-side layer 100 is formed as a perforated layer as in the other-side layer 60 described in the first embodiment. A plurality of opening portions (not illustrated) corresponding to the plurality of opening portions 61 of the other-side layer 60 are formed over the entire surface of the other-side layer 100 in a dispersed state at an opening ratio similar to that of the opening portions 61. Other constructions are substantially similar to those in the first embodiment.

In the second embodiment as described above, when an engine of the truck is started to generate engine sound as noises, the noises are incident on the back panel silencer BS through the back panel 70.

Herein, the back panel 70 is made of a steel plate as in the dash panel 30 described in the first embodiment. Thus, the noises incident on the back panel 70 are partially insulated by the back panel 70 under the non-air permeability thereof, and then are incident on the back panel silencer BS.

When the noises are incident on the back panel silencer BS in such a manner, the noises are incident on the one-side layer 80 adjacent to the back panel silencer BS. Herein, the one-side layer 80 acts as a role as a sound absorption layer made of felt as the same as the one-side layer 40 described in the first embodiment.

Accordingly, the noises incident on the one-side layer 80 are partially absorbed by the one-side layer 80 under the air permeability thereof, and then is incident on the intermediate layer 90 through the one-side layer 80.

The noises partially absorbed by the one-side layer 80 as described above are incident on the intermediate layer 90 from the one-side layer 80. Herein, the intermediate layer 90 is a non-air permeable thin-membrane layer which is formed by stacking the one-side fusion film, the barrier film, and the other-side fusion film as described above as the same as the intermediate layer 50 described in the first embodiment.

Therefore, the noises incident on the intermediate layer 90 cause membrane vibrations in the intermediate layer 90 similarly to the membrane vibrations of the intermediate layer 50 described in the first embodiment in accordance with variations in level of sound pressure of the noises.

Thus, the intermediate layer 90 consumes the energy of the incident noises by membrane vibrations thereof.

In other words, the noises incident on the intermediate layer 90 consume sequentially energy under each of membrane vibrations of the one-side fusion film, the barrier film, and the other-side fusion film of the intermediate layer, thereby to be reduced favorably.

This means that the intermediate layer 90 favorably insulates the noises from the one-side layer 80 by the non-air permeable thin-membrane layer of the three-layer structure.

The noises insulated in such a manner and then transmit through the intermediate layer 90 are incident on the other-side layer 100. Accordingly, the other-side layer 100 vibrates in the vibrating direction of the membrane vibrations of the intermediate layer 90 based on the variations in level of sound pressure of the noises in accordance with the membrane vibrations of the intermediate layer 90 as the same as in the membrane vibrations of the intermediate layer 50 described in the first embodiment.

Herein, the other-side layer 100 is the perforated layer which is constructed as described above by the formation material similar to that of the other-side layer 60 described in the first embodiment. Accordingly, the noises incident on the other-side layer 100 are reduced by the other-side layer 100 with felt of the formation material thereof.

Moreover, the noises incident on the other-side layer 100 are reduced based on frictional contact with an inner circumferential surface portion of each opening portion in a process passing through each opening portion of the other-side layer 100.

As described above, in the back panel silencer BS, the one-side layer 80 is formed from a porous material. Thus, the one-side layer 80 is equivalent to an air layer as in the one-side layer 40 described in the first embodiment.

Moreover, the intermediate layer 90 is the non-air permeable thin-membrane layer, as described above. Accordingly, the three-layer structure formed by the back panel 70, the one-side layer 80, and the intermediate layer 90 is constructed by sandwiching the one-side layer 80 equivalent to the air layer between the intermediate layer 90 equivalent to the non-air permeable thin-membrane layer and the back panel 70.

Therefore, the back panel 70, the one-side layer 80, and the intermediate layer 90 entirely vibrate based on the variations in sound pressure of the noises, since the one-side layer 80 exerts the spring action like the air layer to the variations in sound pressure of the noises.

Accordingly, the intermediate layer 90 and the one-side layer 80 tend to cause a transmission resonance phenomenon in conjunction with the back panel 70 in a low-frequency range of noises.

However, the other-side layer 100 stacked on the intermediate layer 90 is the perforated layer as described above. Therefore, when the other-side layer 100 receives the vibrations of the intermediate layer 90, a perforated portion of the perforated layer and a corresponding portion of the intermediate layer 90 to the perforated portion form a single-layer structure of only the corresponding portion of the intermediate layer 90, thereby to vibrate in accordance with the vibrations of the intermediate layer 90.

On the other hand, a layer portion of the perforated layer and a corresponding portion of the intermediate layer 90 to the layer portion form a two-layer structure, thereby to perform vibration with deviation in phase from the vibrations of the above-mentioned single-layer structure.

Therefore, even when the back panel silencer BS tends to cause the transmission resonance phenomenon at the intermediate layer 90 and the one-side layer 80 in conjunction with the back panel 70 in the low-frequency range of the noises, the transmission resonance phenomenon can be favorably suppressed based on the deviation in phase occurring between the intermediate layer 90 and the other-side layer 100.

Accordingly, the noises incident on the back panel silencer BS through the back panel 70 can be favorably absorbed by the lamination structure of the intermediate layer 90 and the other-side layer 100 equivalent to the perforated layer over the wide frequency range from the low-frequency range to a high-frequency without occurrence of the transmission resonance phenomenon in the low-frequency range.

As described above, in the second embodiment, since the back panel silencer BS is formed so as to have the above-mentioned construction, noises from the cargo bed 10a of the truck and noises from rear wheels of the truck are preferably insulated and absorbed by the back panel silencer BS.

Thus, a soundproofing effect of the back panel silencer BS to the noises from a low-frequency range to a high-frequency range can be preferably achieved similarly to that of the dash silencer DS to the noises described in the first embodiment. Other operations and effects are substantially similar to those in the first embodiment.

Figure 13:
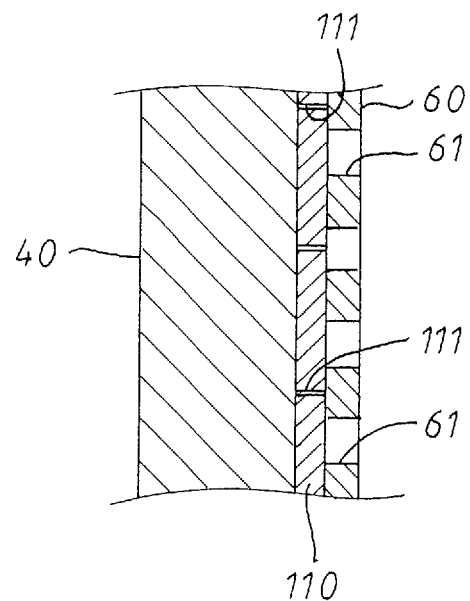
FIG. 13 indicates an enlarged sectional view illustrating major parts of a third embodiment of the present invention.

FIG. 13 illustrates main parts of a third embodiment of the present invention. In the third embodiment, the dash silencer DS described in the first embodiment includes an intermediate layer 110 in place of the intermediate layer 50 described in the first embodiment.

The intermediate layer 110 is constructed as an air permeable thin-membrane layer, differently from the intermediate layer 50 equivalent to the non-air permeable thin-membrane layer described in the first embodiment.

The intermediate layer 110 is formed in a longitudinal section curved shape similarly to that of the intermediate layer 50 along the one-side layer 40. The intermediate layer 110 is sandwiched between the one-side layer 40 and the other-side layer 60 described in the first embodiment (see FIG. 2 and FIG. 13).

Figure 14:
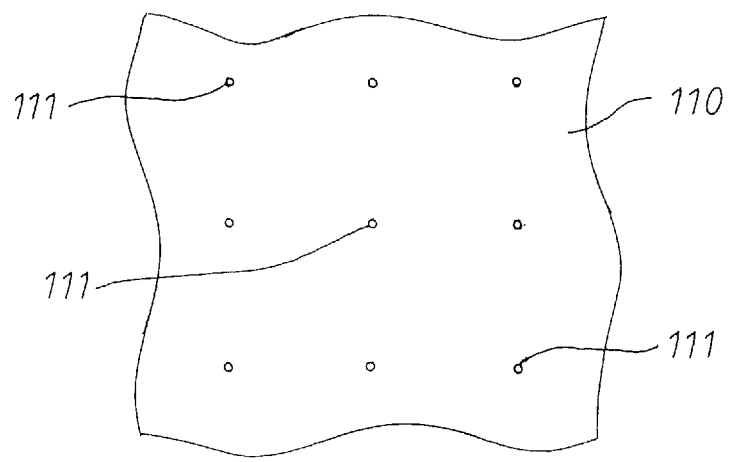
FIG. 14 indicates a partial front view illustrating an intermediate layer of FIG. 13.

Moreover, in the third embodiment the intermediate layer 110 has a plurality of opening portions 111, as illustrated in FIGS. 13 and 14, differently from the intermediate layer 50 equivalent to the non-air permeable thin-membrane layer described in the first embodiment.

The plurality of the opening portions 111 are penetratingly formed respectively in the intermediate layer 110 along its thickness direction in the form of a transverse section circular shape.

Here, the plurality of the opening portions 111 are formed over the entire surface of the intermediate layer 110 in a dispersed state at an opening ratio of 2.5(%) within a predetermined opening ratio range and with an opening diameter of 1 (mm) within a predetermined micro opening diameter range.

Figure 15:
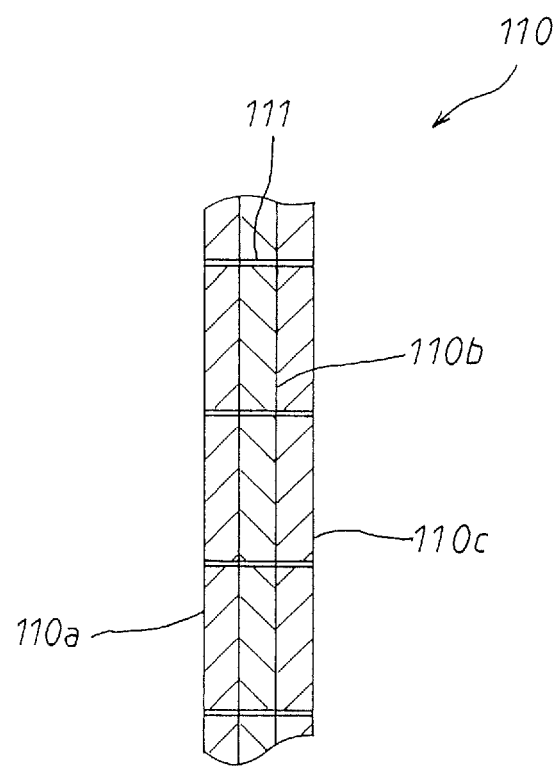
FIG. 15 indicates a partially cutaway sectional view illustrating the intermediate layer in FIG. 13.

Herein, the intermediate layer 110 is, as illustrated in FIG. 15, formed by stacking a one-side fusion film 110a, a barrier film 110b and an other-side fusion film 110c corresponding respectively to the one-side fusion film 50a, the barrier film 50b and the other-side fusion film 50c of the intermediate layer 50 described in the first embodiment. The one-side fusion film 110a is formed from a formation material and a thickness similar to those of the one-side fusion film 50a of the intermediate layer 50. The one-side fusion film 110a is fused at its front surface to the one-side layer 40 along a rear surface thereof.

The barrier film 110b is formed from a formation material and a thickness similar to those of the barrier film 50b. The barrier film 110b is fused at its front surface to a rear surface of the one-side fusion film 110a.

The other-side fusion film 110c is formed from a formation material and a thickness similar respectively to those of the other-side fusion film 50c of the intermediate layer 50. The other-side fusion film 110c is fused at its front surface to the barrier film 110b along a rear surface thereof.

And, the opening portions 111 formed in the intermediate layer 110 are, as illustrated in FIG. 15, formed penetratingly to each of corresponding portions of the one-side fusion film 110a, barrier film 110b and other-side fusion film 110c.

In addition, the other-side layer 60 described in the first embodiment is stacked along the intermediate layer 110 so as to face the one-side layer 40 described in the first embodiment through the intermediate layer 110.

In the third embodiment, the formation materials of the one-side fusion film 110a and other-side fusion film 110c are similar respectively to those of the one-side fusion film 50a and other-side fusion film 50c of the intermediate layer 50, and the formation material of the barrier film 110b is similar to that of the barrier film 50b of the intermediate layer 50.

Thus, it is possible to fuse the one-side fusion film 110a, the barrier film 110b, and the other-side fusion film 110c to each other without melting the barrier film 110b.

Additionally, the thickness of the intermediate layer 110 is similar to that of the intermediate layer 50. A sum of each of the thicknesses of the one-side fusion film 110a, barrier film 110b, and other-side fusion film 110c is similar to the sum of each of the thicknesses of the one-side fusion film 50a, barrier film 50b, and other-side fusion film 50c of the intermediate layer 50.

In the third embodiment, the above-mentioned predetermined opening ratio range and micro opening diameter range are set into a range of 0.01(%) to 5(%) and a range of 0.1 (mm) to 2 (mm) such that noises having a frequency within a frequency range required in the dash silencer DS described in the first embodiment can be favorably absorbed based on the membrane vibrations of the intermediate layer 110 and the porous sound absorption function of the perforated layer 60 made of the porous material and also such that a transmission resonance phenomenon which tends to be occurred in the low-frequency range of noises by the three-layer structure of the dash panel 30, the one-side layer 40, and the intermediate layer 50 described in the first embodiment can be suppressed as the same as in the case of the first embodiment.

Herein, the predetermined opening ratio range and micro opening diameter range are set as described above because of the following reason.

That is, when the opening ratio of each opening portion 111 of the intermediate layer 110 deviates from the predetermined opening ratio range of 0.01(%) to 5(%) or when the opening diameter of each opening portion 111 of the intermediate layer 110 deviates from the predetermined micro opening diameter range of 0.1 (mm) to 2 (mm), the intermediate layer 110 does not cause the transmission resonance phenomenon in the low-frequency range of the noises.

Referring more in detail about this point, in the dash silencer DS described in the first embodiment, the three-layer structure of the dash panel 30, the one-side layer 40, and the intermediate layer 50 causes the transmission resonance phenomenon in the low-frequency range of the noises to degrade the insulating sound performance and the sound absorption performance in the low-frequency region of the noises.

However, the three-layer structure exerts favorable insulating sound performance and sound absorption performance in the high-frequency range of the noises.

In other words, the three-layer structure of the dash panel 30, the one-side layer 40, and the intermediate layer 50 has favorable insulating sound performance and sound absorption performance in a frequency range other than the low-frequency range of the noises.

Accordingly, in the first embodiment, the transmission resonance phenomenon in the low-frequency range of the noises is suppressed by stacking the other-side layer 60 equivalent to the perforated layer on the intermediate layer 50.

As a result, the insulating sound performance and the sound absorption performance are favorably exerted over the wide frequency range from the low-frequency range to the high-frequency range of the noises.

In addition, assuming that the dash silencer DS in the first embodiment has a construction which does not cause the transmission resonance phenomenon in relation to the dash panel 30, the sound absorption performance and the insulating sound performance are degraded in the high-frequency range of the noises, although the sound absorption performance and the insulating sound performance are favorable in the low-frequency range of the noises.

In brief, the dash silencer DS in the first embodiment suppresses the transmission resonance phenomenon in the low-frequency range of the noises, thereby to favorably secure the sound absorption performance and the insulating sound performance over the wide frequency range of the noises.

The inventors of the present invention have found that when the predetermined opening ratio range is set into 0.01(%) to 5(%) and the predetermined micro opening diameter range is set into 0.1 (mm) to 2 (mm) in the third embodiment, the three-layer structure of the dash panel 30, the one-side layer 40, and the intermediate layer 110 favorably maintains the sound absorption performance and the insulating sound performance in the high-frequency range of the noises as the same as in the case of the first embodiment, but tends to cause the transmission resonance phenomenon in the low-frequency range of the noises.

This means that, in the dash silencer DS in the third embodiment, although the intermediate layer 110 having the opening ratio within the range of 0.01(%) to 5(%) and the opening diameter within the range of 0.1 (mm) to 2 (mm) is the air permeable thin-membrane layer, the intermediate layer 110 exerts, over the wide frequency range of the noises, favorable sound absorption performance and insulating sound performance substantially similar to the non-air permeable thin-membrane layer equivalent to the intermediate layer 50 described in the first embodiment. Other constructions are similar to those in the first embodiment.

In the third embodiment as constructed above, when noises are insulated by the dash panel 30 and then are incident on the one-side layer 40 of the dash silencer DS as the same as in the case of the first embodiment, the noises are incident on the intermediate layer 110 while being absorbed by the one-side layer 40 as the same as in the case of the first embodiment.

Herein, the intermediate layer 110 is the air permeable thin-membrane layer which is formed by stacking the one-side fusion film 110a, the barrier film 110b, and the other-side fusion film 110c and has the plurality of opening portions 111 respectively with the opening ratio of 2.5(%) and the opening diameter of 1 (mm), differing from the non-air permeable thin-membrane layer described in the first embodiment.

However, the opening ratio of 2.5(%) and opening diameter of 1 (mm) of each opening portion 111 of the intermediate layer 110 are included respectively within the predetermined opening ratio range and predetermined micro opening diameter range, as previously described.

Therefore, the three-layer structure of the dash panel 30, the one-side layer 40, and the intermediate layer 110 tends to cause a transmission resonance phenomenon in relation to a low-frequency range of noises, as the same as in the three-layer structure of the dash panel 30, the one-side layer 40, and the intermediate layer 50 described in the first embodiment.

Accordingly, the noises incident on the intermediate layer 110 as described above cause the membrane vibrations to the intermediate layer 110 in accordance with variations in level of sound pressure of the noises.

As a result, the noises incident on the intermediate layer 110 are favorably reduced by the plurality of opening portions 111 of the intermediate layer 110 and the respective membrane vibrations of the one-side fusion film 110a, barrier film 110b and other-side fusion film 110c as the same as in the case of the intermediate layer 50 described in the first embodiment.

This means that the intermediate layer 110 insulates favorably the noises from the one-side layer 40 as the air permeable thin-membrane layer, differently from the intermediate layer 50 equivalent to the non-air permeable thin-membrane layer.

When the noises insulated and transmitted through the intermediate layer 110 in such a manner are incident on the other-side layer 60, the other-side layer 60 vibrates in the vibrating direction of the membrane vibrations of the intermediate layer 110 in accordance with the membrane vibrations thereof based on the variations in level of sound pressure in the noises.

Accordingly, the noises incident on the other-side layer 60 are reduced based on frictional contact with an inner circumferential surface of the opening portions 61 in a process in which the noises passes through each opening portion 61 of the other-side layer 60, as the same as in the case of the first embodiment.

Also in the third embodiment, the one-side layer 40 is equivalent to an air layer as described in the first embodiment. Moreover, the intermediate layer 110 is the air permeable thin-membrane layer, as described above, which has the plurality of opening portions 111 with the opening ratio of 2.5(%) and the opening diameter of 1 (mm).

Accordingly, the three-layer structure of the dash panel 30, the one-side layer 40, and the intermediate layer 110 is constructed by sandwiching the one-side layer 40 equivalent to the air layer between the dash panel 30 and the intermediate layer 50 equivalent to the air permeable thin-membrane layer having the plurality of opening portions 111 with opening ratio of 2.5(%) and the opening diameter of 1 (mm).

Therefore, since the one-side layer 40 exerts the spring action like the air layer to the variations in sound pressure of noises, the dash panel 30, the one-side layer 40, and the intermediate layer 110 entirely vibrate together based on the variations in sound pressure of the noises. Accordingly, the intermediate layer 110 and the one-side layer 40 tend to cause the transmission resonance phenomenon together with the dash panel 30 in the low-frequency range of the noises under the plurality of opening portions 111 with the opening ratio of 2.5(%) and the opening diameter of 1 (mm).

However, the other-side layer 60 stacked on the intermediate layer 110 is the perforated layer as described above. Therefore, the perorated portion of the perforated layer and the corresponding portion of the intermediate layer 110 to the perorated portion of the perforated layer form a single-layer structure of only the corresponding portion of the intermediate layer 110.

Accordingly, when the other-side layer 60 receives the vibrations of the intermediate layer 110, the perorated portion of the perforated layer and the corresponding portion of the intermediate layer 110 to the perorated portion of the perforated layer vibrate in accordance with the vibrations of the intermediate layer 110.

On the other hand, the layer portion of the perforated layer equivalent to the other-side layer 60 and the corresponding portion of the non-air permeable thin-membrane layer equivalent to the intermediate layer 110 to the layer portion of the perforated layer form a two-layer structure, thereby to perform vibrations with deviation in shift from the vibrations at the single-layer structure.

Thus, even when also in the third embodiment the dash silencer DS tends to cause the transmission resonance phenomenon at the intermediate layer 110 and the one-side layer 40 together with the dash panel 30 in the low-frequency range of the noises, the transmission resonance phenomenon can be favorably suppressed based on the deviation in phase between the intermediate layer 110 and the other-side layer 60 as described above.

This means that the noises incident on the dash silencer DS through the dash panel 30 can be favorably absorbed and insulated over the wide range from the low-frequency range to the high-frequency range without occurrence of the transmission resonance phenomenon in the low-frequency range of the noises on a basis of the lamination structure of the other-side layer 60 equivalent to the perforated layer and the intermediate layer 110 equivalent to the air permeable thin-membrane layer having the plurality of opening portions 111 with the opening ratio of 2.5(%) and the opening diameter of 1 (mm).

As described above, in the third embodiment, the dash silencer DS is formed so as to have the above construction. Accordingly, even when the dash silencer DS tends to cause the transmission resonance phenomenon in the low-frequency range of the noises at the one-side layer 40 and the intermediate layer 110 equivalent to the air permeable thin-membrane layer having the plurality of opening portions 111 with the opening ratio of 2.5(%) and the opening diameter of 1 (mm) in conjunction with the dash panel 30, the transmission resonance phenomenon can be favorably suppressed based on the deviation in phase of vibrations occurred between the air permeable thin-membrane layer equivalent to the intermediate layer 110 and the perforated layer equivalent to the other-side layer 60.

This means that also in the third embodiment, degradation in sound absorption performance of the dash silencer DS owing to the transmission resonance phenomenon which tends to occur in the low-frequency range of the noises can be favorably suppressed based on the deviation in phase of vibrations occurred between the intermediate layer 110 and the other-side layer 60.

In such a manner, The dash silencer DS suppresses the transmission resonance phenomenon which tends to occur in the low-frequency range of the noises in relation to the dash panel 30 as described above, thereby to be able to be provided as a dash silencer for a motor vehicle capable of favorably performing soundproof of the noises in a wide frequency range of a low-frequency range to a high-frequency range of the noises.

As a result, even when in the third embodiment, engine sounds from the engine room 10 are incident as noises on the dash silencer DS, the noises are favorably insulated and absorbed over the low-frequency range to the high-frequency range of the noises. This means that the soundproofing effect to the engine sounds by the dash silencer DS can be favorably achieved from the low-frequency range to the high-frequency range of the noises. Other operations and effects are similar to those in the first embodiment.

Incidentally, in the third embodiment, using the dash silencer DS as a working example 4, the transmission sound loss characteristic of the working example 4 were measured by a transmission sound loss test in relation to a frequency of noises.

For the measurement, comparative examples 3 and 5 were prepared, and transmission sound loss characteristics of the comparative examples 3 and 5 were measured by the transmission sound loss test in relation to the frequency of the noises.

Herein, the comparative example 3 is made of the steel plate with the thickness of 0.8 (mm) described in the first embodiment, and is equivalent to the comparative example 1. The comparative example 5 has a construction in which the other-side layer 60 is formed as a non-perforated second layer having no opening portions 61 in the working example 4.

Accordingly, the comparative example 5 has a lamination structure of the one-side layer 40 and intermediate layer 110 of the working example 4 and the non-perforated second layer.

In addition, the comparative example 5 has the same construction as that of the working example 4 except that the other-side layer 60 of the working example 4 is formed as the non-perforated second layer.

Figure 16:
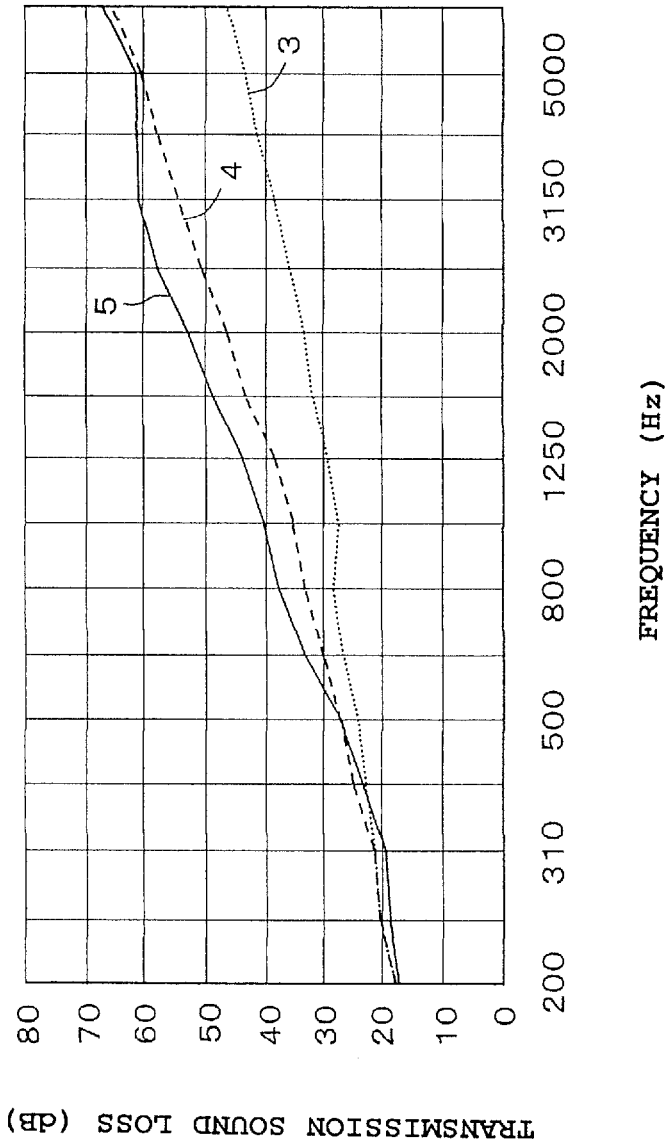
FIG. 16 is a graph showing a relation between a transmission sound loss characteristic and a frequency of noise with regard to a working example and comparative examples in the third embodiment.

When measuring the transmission sound loss characteristics of the working example 4, comparative example 3 and comparative example 5, each of graphs 4, 5 and 3 were obtained as each of line graphs shown in FIG. 16. The line graph 4 represents the transmission sound loss characteristic of the working example 4. The line graph 5 represents the transmission sound loss characteristic of the comparative example 5. Additionally, the line graph 3 represents the transmission sound loss characteristic of the comparative example 3, and is similar to the line graph 3 in FIG. 8.

It is apparent from the line graph 4 that the transmission sound loss is not decreased in the low-frequency range of the noises. This is based on the following reasons.

The intermediate layer 110 interposed between the one-side layer 40 and the other-side layer 60 in the working example 4 is the air permeable layer as described above, and is, more specifically, the air permeable thin-membrane layer having the plurality of opening portions 111 with the opening ratio of 2.5(%) and the opening diameter of 1 (mm).

Herein, the opening ratio and opening diameter of each of the opening portions 111 are included respectively within the predetermined opening ratio range and predetermined micro opening diameter range. From this reason, the intermediate layer 110 acts a role substantially similar to that of the non-air permeable layer equivalent to the intermediate layer 50 described in the first embodiment. Therefore, the intermediate layer 110 does not function as the air layer.

Accordingly, even when noises are incident on the intermediate layer 110, the intermediate layer 110 performs membrane vibrations according to the variations in level of sound pressure in the noises without the spring action like the air layer. As a result, the other-side layer 60 also vibrates in accordance with the membrane vibrations of the intermediate layer 110.

Herein, the intermediate layer 110 is very thinner in thickness than the other-side layer 60 and is much lighter in weight than the other-side layer 60. Therefore, the intermediate layer 110 and the other-side layer 60 are different in natural frequency from each other.

Accordingly, the intermediate layer 110 and the other-side layer 60 are different in vibration manner from each other. As a result, the intermediate layer 110 and the other-side layer 60 do not resonate with each other.

As is understood from the comparison between line graphs 4 and 5, the working example 4 exerts the transmission sound loss characteristic having a tendency similar substantially to that of the comparative example 5 over 200 (Hz) to 5000 (Hz) of all the frequency range of the noises.

However, in the working example 4, the one-side layer 40 functions as the air layer when it is disposed along the dash panel 30, as described above.

Accordingly, when the noises from the engine room 10 are incident on the working example 4 through the dash panel 30, the transmission resonance phenomenon which tends to occur in relation to the low-frequency range of the noises at the three-layer structure of the dash panel 30, the one-side layer 40 equivalent to the air layer, and the intermediate layer 110 equivalent to the air permeable thin-membrane layer having the plurality of opening portions 111 with the opening ratio of 2.5(%) and the opening diameter of 1 (mm) can be favorably suppressed by the lamination structure of the intermediate layer 110 equivalent to the air permeable thin-membrane layer and the other-side layer 60 equivalent to the perforated layer, as described above.

As a result, even when the working example 4 is disposed along the dash panel 30 as described above, the working example 4 suppresses favorably the membrane vibrations of the intermediate layer 110 tending to occur in relation to the low-frequency range of the noises, and can vibrate at the one-side layer 40, the intermediate layer 110, and the other-side layer 60 without causing resonance according to the membrane vibrations of the intermediate layer 110.

The other-side layer 60 of the working example 4 is the perforated layer as constructed above. On the other hand, the non-perforated second layer of the comparative example 5 is an air permeable layer which does not have opening portions unlike the other-side layer 60. Therefore, the basis weight of the other-side layer 60 of the working example 4 is more lightweight compared with that of the other-side layer of the comparative example 5.

In other words, it is understood that though the dash silencer DS of the working example 4 is very lighter in weight than the comparative example 5, the dash silencer DS of the working example 4 can exert the transmission sound loss characteristic substantially similar to that of the comparative example 5 while suppressing favorably the transmission resonance phenomenon tending to occur in relation to the low-frequency range of the noises.

In addition, it is apparent from the line graph 3 that the transmission sound loss characteristic of the working example 4 is more excellent than the transmission sound loss characteristic of the comparative example 3.

Figure 17:
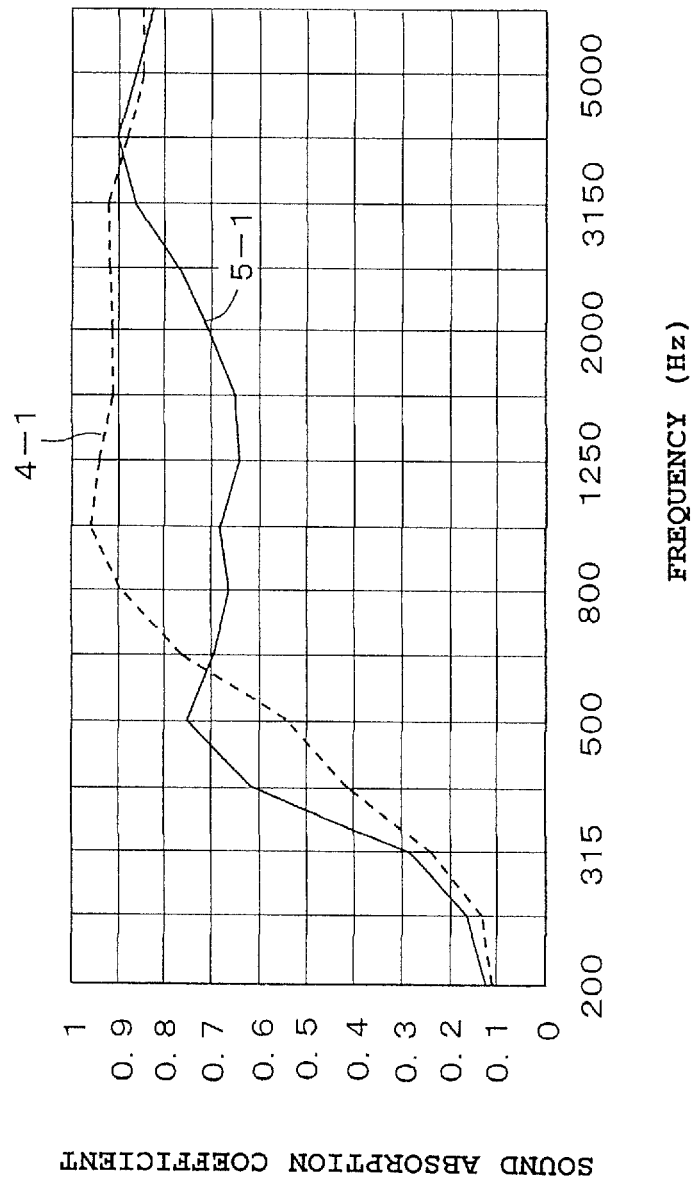
FIG. 17 is a graph showing a relation between a sound absorption coefficient characteristic and the frequency of the noise with regard to the working example and the comparative examples in the third embodiment.

Furthermore, the sound absorption coefficient characteristics of the working example 4 and comparative example 5 were measured by a reverberation room method sound absorption coefficient test in relation to the frequency of the noises. Accordingly, graphs 4-1 and 5-1 were obtained respectively as line graphs shown in FIG. 17. Herein, the line graph 4-1 represents the sound absorption coefficient characteristic of the working example 4. The line graph 5-1 represents the sound absorption coefficient characteristic of the comparative example 5.

Trying to compare both of the line graphs 4-1 and 5-1, It is understood that the sound absorption coefficient characteristic of the working example 4 has a tendency similar substantially to the sound absorption coefficient characteristic of the comparative example 5.

In other words, it is understood that though the dash silencer DS of the working example 4 is much lighter in weight than the comparative example 5, as described above, the dash silencer DS of the working example 4 can exert the sound absorption coefficient characteristic similar substantially to that of the comparative example 5.

In addition to the working example 4, the inventors of the present invention prepared a plurality of dash silencers by changing the opening ratio and the opening diameter of each opening portion of the intermediate layer, the mass of the other-side layer and the opening ratio of each opening portion of the other-side layer. Then, regarding the respective dash silencers, the measurements similar to those as described above were performed.

As a result, it is understood that the respective dash silencers described above can exert soundproofing sound effects as a dash silencer substantially similar to the working example 4, when the opening ratio and opening diameter of each opening portion of the intermediate layer are respectively included within the respective predetermined opening ratio range and opening diameter range as described above, and the volume density, thickness and basis weight of the other-side layer 60 are included respectively within 0.1 (g/cm$^3$) to 0.4 (g/cm$^3$), 3 (mm) to 15 (mm), and 100 (g/m$^2$) to 1600 (g/m$^2$), and the opening ratio of the other-side layer is included within 5(%) to 50(%), as described in the first embodiment.

In addition, When in the back panel silencer BS described in the second embodiment, the intermediate layer 90 is formed as the air permeable thin-membrane layer similar in construction to the intermediate layer 110 described in the third embodiment, the back panel silencer BS described in the second embodiment can achieve operations and effects similar to those of the dash silencer DS described in the third embodiment.

The following various modifications are given for embodying the present invention without being limited to the embodiments.

(1) For embodying the present invention, the non-air permeable thin-membrane layer equivalent to the intermediate layer 50 or 90 is not limited to the three-layer structure of the films described in the first or second embodiment, and may be constructed by various thin membranes such as two films or a two-layer film, and three films or a three-layer film.

(2) For embodying the present invention, the air permeable thin-membrane layer equivalent to the intermediate layer 110 is not limited to the three-layer structure of the films described in the third embodiment, and may be constructed by various thin membranes such as two films or a two-layer film having a plurality of opening portions with the opening ratio and the opening diameter, and three films or a three-layer film having a plurality of opening portions with the opening ratio and the opening diameter.

(3) For embodying the present invention, the formation materials of the one-side layer 40 or 80 and of the other-side layer 60 or 100 are not limited to those described in the first or second embodiment, and may be a structural material of organic fiber such as PET or wool and inorganic fiber such as glass wool, or a porous synthetic resin material such as urethane foam.

(4) For embodying the present invention, the other-side layer 60 is not limited to being made of the porous material as long as it is formed as the perforated layer, and may be made of various synthetic resin materials.

(5) For embodying the present invention, the noises to be incident on the dash silencer DS are not limited to the engine sounds, and may include various kinds of noises to be incident into the vehicle compartment. The noises to be incident on the back panel silencer BS are not limited to the noises from the cargo bed 10a or the rear wheels, and may include various kinds of noises to be incident into the vehicle compartment.

(6) For embodying the present invention, the present invention is not limited to being applied to the dash silencer or the back panel silencer, and may be applied to a floor silencer, a pillar silencer, a roof silencer, a room partition silencer, a hood silencer, an engine under cover silencer, a floor carpet or the like.

(7) For embodying the present invention, an opening shape of each opening portion of the other-side layer is not limited to be the circular shape, and may be any shape such as a rhombic shape, a triangular shape, a square shape, a long elliptic shape, or other elliptic shapes.

(8) For embodying the present invention, the dash panel 30 described in the first embodiment is not limited to be the steel plate with the thickness of 0.8 (mm). Particularly, the thickness is not limited to 0.8 (mm) as long as the dash panel 30 is made of a metal plate suitable for separating the engine room 10 and the vehicle compartment 20 from each other and supporting the dash silencer DS.

What is claimed is:

1. A soundproof body for a motor vehicle comprising:
a first layer made of a porous material;
an intermediate layer formed as a non-air permeable thin-membrane layer of at least one film, said intermediate layer being stacked on said first layer; and
a second layer constructed as a perforated layer having a plurality of opening portions in a dispersed state with an opening diameter and an opening ratio within predetermined ranges so as to exert favorable porous sound absorption function, said second layer being stacked on said intermediate layer so as to face said first layer through said intermediate layer,
wherein a non-perforated layer portion of the second layer and a corresponding portion of the intermediate layer to the layer portion vibrate with deviation in phase such that a transmission resonance phenomenon can be favorably suppressed in a low frequency range of noises of 200 Hz to 500 Hz based on the deviation in phase generated between the intermediate layer and the second layer.

2. The soundproof body for a motor vehicle according to claim 1,
wherein said intermediate layer is formed as a three-layer film structure constructed with a one-side fusion film made of a thermoplastic material and fused to said first layer, a barrier film made of a thermoplastic material which is higher in melting point than the thermoplastic material of said one-side fusion film, said barrier film being fused to said one-side fusion film so as to face said first layer through said one-side fusion film, and an other-side fusion film made of a thermoplastic material which is lower in melting point than the thermoplastic material of said barrier film, said other-side fusion film being fused to said barrier film so as to face said one-side fusion film through said barrier film, and
said second layer is a perforated porous layer made of a porous material so as to have a plurality of opening portions in a dispersed state, and is fused to said other-side fusion film of said intermediate layer.

3. A soundproof body for a motor vehicle according to claim 2,
wherein the opening ratio of the plurality of opening portions is capable of reducing noises over a wide frequency range from a low-frequency range to a high frequency of the noises.

4. The soundproof body for a motor vehicle according to claim 1, wherein
the predetermined range of the opening ratio is 5% to 50% and the predetermined range of the opening diameter is 10 mm to 80 mm.

5. A soundproof body for a motor vehicle comprising:
a first layer made of a porous material;
an intermediate layer constructed as an air permeable thin-membrane layer of at least one film having a plurality of opening portions in a dispersed state with an opening ratio and a micro opening diameter within predetermined ranges so as to cause a transmission resonance phenomenon in a low frequency range of noises but favorably maintain sound absorption performance and insulating sound performance in a high frequency range of noises, said intermediate layer being stacked on said one-side layer; and
a second layer stacked on said intermediate layer so as to face said first layer through said intermediate layer,
wherein the predetermined range of the opening ratio of each opening portion is 0.01% to 5.0% and the predetermined range of the micro opening diameter is 0.1 mm to 2.0 mm.

6. The soundproof body for a motor vehicle according to claim 5,
wherein said intermediate layer is formed as a three-layer film structure constructed with a one-side fusion film made of a thermoplastic material and fused to said first layer, a barrier film made of a thermoplastic material which is higher in melting point than the thermoplastic material of said one-side fusion film, said barrier film being fused to said one-side fusion film so as to face said first layer through said one-side fusion film, and an other-side fusion film made of a thermoplastic material which is lower in melting point than the thermoplastic material of said barrier film, said other-side fusion film being fused to said barrier film so as to face said one-side fusion film through said barrier film, the three-layer film structure having a plurality of opening portions with the opening ratio and the opening diameter, and
said second layer is a perforated porous layer so as to have the plurality of opening portions in the dispersed state, and is fused to said other-side fusion film of said intermediate layer.

7. The soundproof body for a motor vehicle according to claim 6,
wherein the micro opening diameter of the plurality of opening portions is capable reducing noises over a wide frequency range from a low-frequency range to a high frequency of the noises.

8. A silencer for a motor vehicle with a vehicle body being mounted on a plate-shaped member in the vehicle body, comprising:

a soundproof body including;
a first layer made of a porous material, said first layer being mounted on the plate-shaped member of the vehicle body;
an intermediate layer formed as a non-air permeable thin-membrane layer of at least one film, said intermediate layer being stacked on said first layer; and
a second layer constructed as a perforated layer having a plurality of opening portions in a dispersed state with an opening diameter and an opening ratio within predetermined ranges so as to exert favorable porous sound absorption function, said second layer being stacked on said intermediate layer so as to face said first layer through said intermediate layer,
wherein a non-perforated layer portion of the second layer and a corresponding portion of the intermediate layer to the layer portion vibrate with deviation in phase such that a transmission resonance phenomenon can be favorably suppressed in a low frequency range of noises of 200 Hz to 500 Hz based on the deviation in phase generated between the intermediate layer and the second layer.

9. The silencer for a motor vehicle with a vehicle body being mounted on a plate-shaped member in the vehicle body according to claim 8,
wherein in said soundproof body, said intermediate layer is formed as a three-layer film structure constructed with a one-side fusion film made of a thermoplastic material and fused to said first layer, a barrier film made of a thermoplastic material which is higher in melting point than the thermoplastic material of said one-side fusion film, said barrier film being fused to said one-side fusion film so as to face said first layer through said one-side fusion film, and an other-side fusion film made of a thermoplastic material which is lower in melting point than the thermoplastic material of said barrier film, said other-side fusion film being fused to said barrier film so as to face said one-side fusion film through said barrier film, and
said second layer is a perforated porous layer made of a porous material so as to have a plurality of opening portions in a dispersed state, and is fused to said other-side fusion film of said intermediate layer.

10. The silencer for a motor vehicle with a vehicle body being mounted on a plate-shaped member in the vehicle body according to claim 8,
wherein the plate-shaped member of the vehicle body of the motor vehicle is a dash panel configured to separate an engine room and a vehicle compartment from each other in the vehicle body of the motor vehicle, and
said soundproof body is mounted, as a dash silencer, at said first layer on the dash panel from the inside of the motor vehicle compartment.

11. The silencer for a motor vehicle with a vehicle body being mounted on a plate-shaped member in the vehicle body according to claim 8,
wherein the plate-shaped member of the vehicle body of the motor vehicle is a back panel configured to separate a cargo bed and a vehicle compartment from each other in a vehicle body of a truck, and
said soundproof body is mounted, as a back panel silencer, at said first layer on the back panel from the inside of the motor vehicle compartment.

12. The silencer for a motor vehicle with a vehicle body being mounted on a plate-shaped member in the vehicle body according to claim 8,
the predetermined range of the opening ratio is 5% to 50% and the predetermined range of the opening diameter is 10 mm to 80 mm.

13. A silencer for a motor vehicle with a vehicle body being mounted on a plate-shaped member in the vehicle body comprising:
a soundproof body including;
a first layer made of a porous material, said first layer being mounted on the plate-shaped member of the vehicle body;
an intermediate layer constructed as an air permeable thin-membrane layer of at least one film having a plurality of opening portions in a dispersed state with an opening ratio and a micro opening diameter within predetermined ranges so as to cause a transmission resonance phenomenon in a low frequency range of noises but favorably maintain sound absorption performance and insulating sound performance in a high frequency range of noises, said intermediate layer being stacked on said first layer; and
a second layer formed as a perforated porous layer made of a porous material, said second layer being stacked on said intermediate layer so as to face said first layer through said intermediate layer,
wherein the predetermined range of the opening ratio of each opening portion is 0.01% to 5.0% and the predetermined range of the micro opening diameter is 0.1 mm to 2.0 mm.

14. The silencer for a motor vehicle with a vehicle body being mounted on a plate-shaped member in the vehicle body according to claim 13,
wherein in said soundproof body, said intermediate layer is formed as a three-layer film structure constructed with a one-side fusion film made of a thermoplastic material and fused to said first layer, a barrier film made of a thermoplastic material which is higher in melting point than the thermoplastic material of said one-side fusion film, said barrier film being fused to said one-side fusion film so as to face said first layer through said one-side fusion film, and an other-side fusion film made of a thermoplastic material which is lower in melting point than the thermoplastic material of said barrier film, said other-side fusion film being fused to said barrier film so as to face said one-side fusion film through said barrier film, the three-layer film structure having a plurality of opening portions with the opening ratio and the opening diameter, and
said second layer is a perforated porous layer so as to have a plurality of opening portions in a dispersed state, and is fused to said other-side fusion film of said intermediate layer.

15. The silencer for a motor vehicle with a vehicle body being mounted on a plate-shaped member in the vehicle body according to claim 13,
wherein the plate-shaped member of the vehicle body of the motor vehicle is a dash panel configured to separate an engine room and a vehicle compartment from each other in the vehicle body of the motor vehicle, and
said soundproof body is mounted, as a dash silencer, at said first layer on the dash panel from the inside of the motor vehicle compartment.

16. The silencer for a motor vehicle with a vehicle body being mounted on a plate-shaped member in the vehicle body according to claim 13,
wherein the plate-shaped member of the vehicle body of the motor vehicle is a back panel configured to separate a cargo bed and a vehicle compartment from each other in a vehicle body of a truck, and said soundproof body is mounted, as a back panel silencer, at said first layer on the back panel from the inside of the motor vehicle compartment.

* * * * *